United States Patent
Sinha et al.

(10) Patent No.: US 8,671,130 B2
(45) Date of Patent: Mar. 11, 2014

(54) SYSTEM AND METHOD FOR MANAGING DATA ITEMS

(75) Inventors: Anand Sinha, Hamilton (CA); Allan D. Lewis, New Dundee (CA); Carl L. Cherry, Waterloo (CA); Andrew J. Legg, Kitchener (CA); Jeffrey R. Schnurr, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1594 days.

(21) Appl. No.: 10/490,247

(22) PCT Filed: Sep. 23, 2002

(86) PCT No.: PCT/CA02/01448
§ 371 (c)(1),
(2), (4) Date: Mar. 19, 2004

(87) PCT Pub. No.: WO03/026235
PCT Pub. Date: Mar. 27, 2003

(65) Prior Publication Data
US 2004/0266441 A1    Dec. 30, 2004

Related U.S. Application Data

(60) Provisional application No. 60/323,865, filed on Sep. 21, 2001.

(51) Int. Cl.
*G06F 15/16* (2006.01)

(52) U.S. Cl.
USPC .......................................................... 709/200

(58) Field of Classification Search
USPC .......................................................... 709/221
See application file for complete search history.

(56) References Cited

U.S. PATENT DOCUMENTS

| 5,764,899 A | | 6/1998 | Eggleston et al. | |
|---|---|---|---|---|
| 5,771,353 A | | 6/1998 | Eggleston et al. | |
| 5,844,969 A | * | 12/1998 | Goldman et al. | 379/93.24 |
| 5,905,777 A | * | 5/1999 | Foladare et al. | 379/90.01 |
| 5,948,059 A | * | 9/1999 | Woo et al. | 709/206 |
| 5,958,006 A | | 9/1999 | Eggleston et al. | |

(Continued)

FOREIGN PATENT DOCUMENTS

| EP | 0322105 A2 * | 6/1989 |
|---|---|---|
| WO | 97-22936 | 6/1997 |

OTHER PUBLICATIONS

Woo et al., "Pigeon: a wireless two-way messaging system" Selected Areas in Communications, IEEE Journal on vol. 15, Issue 8, Oct. 1997 pp. 1391-1405.*

(Continued)

*Primary Examiner* — William Goodchild
(74) *Attorney, Agent, or Firm* — The Danamraj Law Group, P.C.

(57) ABSTRACT

A system for managing the exchange of data items between a mail database on a mail server and a mobile communication device operable to send and receive data items over a wireless network, wherein the mail database and the mobile communication device are associated with a user address and wherein the data items are stored in the mail database and referenced by corresponding mail database identifiers, includes a state database associated with the user address. The state database is operable to receive and store the mail database identifiers corresponding to the data items stored in the mail database.

14 Claims, 12 Drawing Sheets

(56) References Cited

U.S. PATENT DOCUMENTS

| | | | |
|---|---|---|---|
| 5,978,837 A * | 11/1999 | Foladare et al. | 709/207 |
| 6,101,531 A | 8/2000 | Eggleston et al. | |
| 6,157,630 A | 12/2000 | Adler et al. | |
| 6,219,694 B1 | 4/2001 | Lazaridis et al. | |
| 6,389,457 B2 | 5/2002 | Lazaridis et al. | |
| 6,401,113 B2 | 6/2002 | Lazaridis et al. | |
| 6,438,585 B2 | 8/2002 | Mousseau et al. | |
| 6,463,463 B1 | 10/2002 | Godfrey et al. | |
| 6,463,464 B1 | 10/2002 | Lazaridis et al. | |
| 6,480,885 B1 * | 11/2002 | Olivier | 709/207 |
| 6,667,971 B1 * | 12/2003 | Modarressi et al. | 370/352 |
| 6,701,378 B1 | 3/2004 | Gilhuly et al. | |
| 6,779,019 B1 | 8/2004 | Mousseau et al. | |
| 6,941,349 B2 | 9/2005 | Godfrey et al. | |
| 7,209,949 B2 | 4/2007 | Mousseau et al. | |
| 7,209,955 B1 | 4/2007 | Major et al. | |
| 7,266,365 B2 | 9/2007 | Ferguson et al. | |
| 7,386,588 B2 | 6/2008 | Mousseau et al. | |
| 7,509,376 B2 | 3/2009 | Mousseau et al. | |
| 7,606,936 B2 | 10/2009 | Mousseau et al. | |
| 7,685,244 B2 | 3/2010 | Mousseau et al. | |
| 7,689,721 B2 | 3/2010 | Mousseau et al. | |
| 7,734,281 B2 | 6/2010 | Ferguson et al. | |
| 7,779,151 B2 | 8/2010 | Major et al. | |
| 7,818,033 B2 | 10/2010 | Ferguson et al. | |
| 7,953,802 B2 | 5/2011 | Mousseau et al. | |
| 8,024,416 B2 | 9/2011 | Ferguson et al. | |
| 8,050,661 B2 | 11/2011 | Mousseau et al. | |
| 8,060,564 B2 | 11/2011 | Mousseau et al. | |
| 2001/0005857 A1 | 6/2001 | Lazaridis et al. | |
| 2001/0005861 A1 | 6/2001 | Mousseau et al. | |
| 2001/0005864 A1 * | 6/2001 | Mousseau et al. | 709/318 |
| 2001/0013071 A1 | 8/2001 | Lazaridis et al. | |
| 2001/0034225 A1 * | 10/2001 | Gupte et al. | 455/412 |
| 2002/0013854 A1 | 1/2002 | Eggleston et al. | |
| 2002/0029247 A1 * | 3/2002 | Kawamoto | 709/206 |
| 2002/0049818 A1 | 4/2002 | Gilhuly et al. | |
| 2002/0086661 A1 * | 7/2002 | Rouse et al. | 455/412 |
| 2003/0005066 A1 | 1/2003 | Lazaridis et al. | |
| 2003/0028606 A1 * | 2/2003 | Koopmans et al. | 709/206 |
| 2003/0050987 A1 | 3/2003 | Lazaridis et al. | |
| 2003/0084184 A1 | 5/2003 | Eggleston et al. | |
| 2003/0191808 A1 | 10/2003 | Adler et al. | |
| 2003/0208556 A1 * | 11/2003 | Friedman et al. | 709/218 |
| 2004/0024824 A1 | 2/2004 | Ferguson et al. | |
| 2004/0073619 A1 | 4/2004 | Gilhuly et al. | |
| 2004/0136358 A1 | 7/2004 | Hind et al. | |
| 2004/0205106 A1 | 10/2004 | Adler et al. | |
| 2005/0159136 A1 * | 7/2005 | Rouse et al. | 455/412.1 |
| 2007/0288582 A1 | 12/2007 | Major et al. | |
| 2008/0043675 A1 | 2/2008 | Mousseau et al. | |
| 2008/0043676 A1 | 2/2008 | Mousseau et al. | |
| 2008/0043694 A1 | 2/2008 | Mousseau et al. | |
| 2008/0044029 A1 | 2/2008 | Gilhuly et al. | |
| 2008/0045193 A1 | 2/2008 | Lazaridis et al. | |
| 2008/0045194 A1 | 2/2008 | Gilhuly et al. | |
| 2008/0045253 A1 | 2/2008 | Mousseau et al. | |
| 2008/0045266 A1 | 2/2008 | Lazaridis et al. | |
| 2008/0045267 A1 | 2/2008 | Hind et al. | |
| 2008/0046526 A1 | 2/2008 | Lazaridis et al. | |
| 2008/0046527 A1 | 2/2008 | Lazaridis et al. | |
| 2008/0046528 A1 | 2/2008 | Gilhuly et al. | |
| 2008/0046529 A1 | 2/2008 | Gilhuly et al. | |
| 2008/0046530 A1 | 2/2008 | Lazaridis et al. | |
| 2008/0046534 A1 | 2/2008 | Mousseau et al. | |
| 2008/0046535 A1 | 2/2008 | Mousseau et al. | |
| 2008/0046591 A1 | 2/2008 | Gilhuly et al. | |
| 2008/0046592 A1 | 2/2008 | Gilhuly et al. | |
| 2008/0046594 A1 | 2/2008 | Lazaridis et al. | |
| 2008/0051141 A1 | 2/2008 | Ferguson et al. | |
| 2008/0052365 A1 | 2/2008 | Mousseau et al. | |
| 2008/0052409 A1 | 2/2008 | Lazaridis et al. | |
| 2008/0057964 A1 | 3/2008 | Gilhuly et al. | |
| 2008/0058013 A1 | 3/2008 | Lazaridis et al. | |
| 2008/0059657 A1 | 3/2008 | Lazaridis et al. | |
| 2008/0109530 A1 | 5/2008 | Ferguson et al. | |
| 2008/0261632 A1 | 10/2008 | Hind et al. | |
| 2008/0261633 A1 | 10/2008 | Lazaridis et al. | |
| 2008/0263224 A1 | 10/2008 | Gilhuly et al. | |
| 2008/0288604 A1 | 11/2008 | Major et al. | |
| 2009/0172079 A1 | 7/2009 | Eggleston et al. | |
| 2011/0202597 A1 | 8/2011 | Mousseau et al. | |

OTHER PUBLICATIONS

"Technical White Paper, BlackBerry Exchange Edition TM" Research in Motion Ltd., Version 2.0, 2000.*

Cree et al., "Methods of appending a reply in an electronic information system", European Patent Applicaiton, Publication No. 0 322 105 A2, Published: Jun. 28, 1989.*

Woo T Y C et al: "Providing Internet Services to Mobile Phones: A case study with Email" Personal, Indoor and Mobile Radio Communications, 1998. The Ninth IEEE International Symposium on Boston, MA, USA Sep. 8-11, 1998, New York, NY, USA, IEEE, US, Sep. 8, 1998, pp. 99-105, XP 010314728 ISBN: 0-7803-4872-9.

European Examination Report in EP Application No. 02764425.1; European Patent Office; May 16, 2008; 4 pages.

CIPO, Office Action, Application No. 2461075, Dec. 29, 2008, 3 pgs.

CIPO, Notice of Allowance, Application No. 2461075, Mar. 17, 2010, 1 pg.

EPO, International Search Report with Written Opinion, Application No. PCT/CA2002/01448, May 22, 2003, 14 pgs.

EPO, Communication Pursuant to Article 94(3) EPC, Application No. 02764425.1, Oct. 6, 2004, 4 pgs.

EPO, Communication Pursuant to Article 94(3) EPC, Application No. 02764425.1, Feb. 10, 2006, 4 pgs.

EPO, Communication Pursuant to Article 94(3) EPC, Application No. 02764425.1, Oct. 19, 2007, 3 pgs.

EPO, Communication Pursuant to Article 94(3) EPC, Application No. 02764425.1, Jan. 22, 2009, 6 pgs.

EPO, Decision to Grant a European Patent Pursuant to Article 97(1) EPC, Application No. 02764425.1, Jun. 12, 2009, 3 pgs.

Hong Kong IPD, Certification of Grant, Application No. 04105407.2, Nov. 20, 2009, 2 pgs.

* cited by examiner

SYSTEM AND METHOD FOR MANAGING DATA ITEMS

This application claims benefit of U.S. Provisional Application Ser. No. 60/323,865, entitled "System and Method for Managing Data Items," and filed on Sep. 21, 2001. The entire disclosure of this application, including the specification, drawings, and all appendices, is incorporated herein by reference.

FIELD OF THE INVENTION

The present invention is directed toward the field of managing data items communicated between a host system and a mobile communication device.

DESCRIPTION OF THE STATE OF THE ART

A redirector program operating at a host system enables a user to redirect or mirror certain user-selected data items (or parts of data items) from the host system to a user's mobile data communication device upon detecting that one or more user-defined triggering events has occurred. Typically, the host system comprises an e-mail server and a data item store, such as a database, in which data items related to e-mail communications or other communications are stored. While some host systems provide for modification of the data item store by the redirector program, other host systems do not allow such modifications. In the event that the redirector program modifies the data store, the data store may be corrupted. Thus, there is a need for a system and method that provides for redirection of data items from a host system to a mobile communication device without corrupting or otherwise interfering with data item stores at the host system.

SUMMARY

A system for managing the exchange of data items between a mail database on a mail server and a mobile communication device operable to send and receive data items over a wireless network, wherein the mail database and the mobile communication device are associated with a user address and wherein the data items are stored in the mail database and referenced by corresponding mail database identifiers, includes a state database associated with the user address. The state database is operable to receive and store the mail database identifiers corresponding to the data items stored in the mail database.

DETAILED DESCRIPTION

Figure 1:
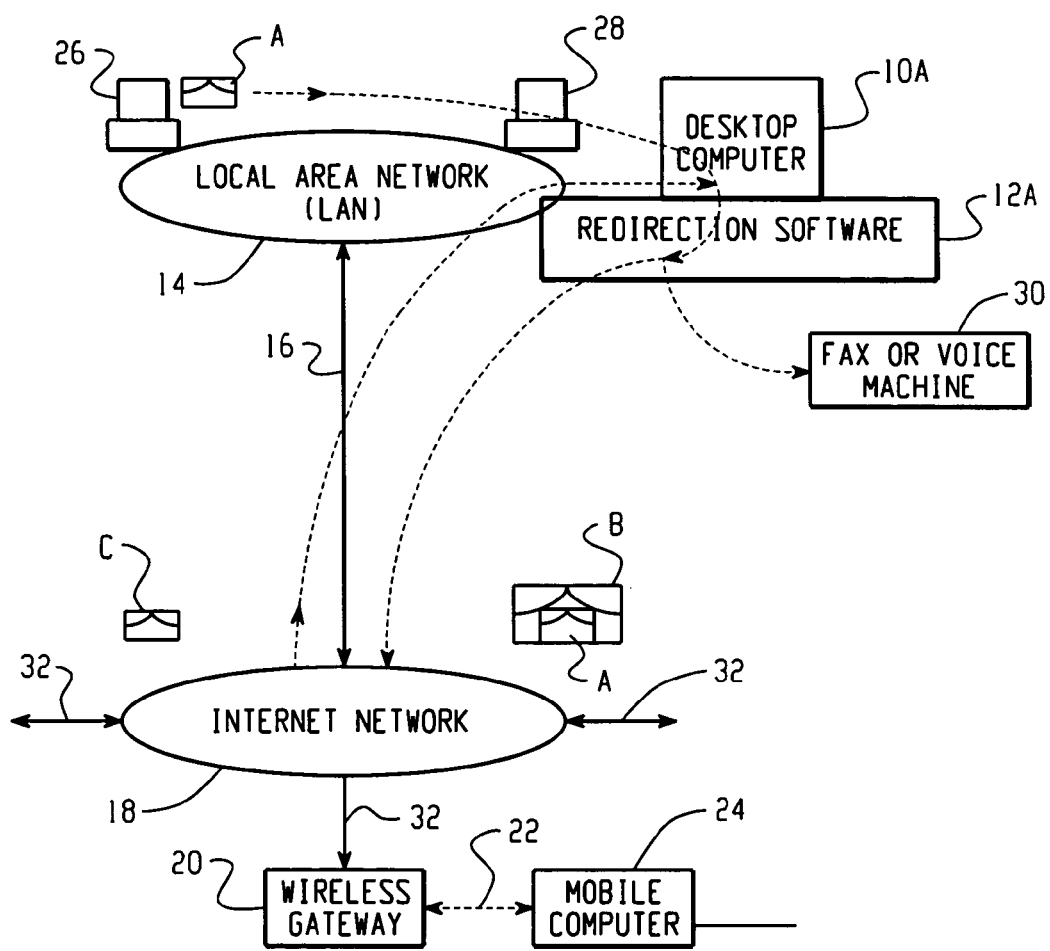
FIG. 1 is a system diagram showing the redirection of user data items from a user's desktop PC (host system) to the user's mobile data communication device, where the redirector software is operating at the user's desktop PC.

As used in this application, the term host system refers to the computer or network of computers where the redirector software is operating. The computer may be a server or a desktop client computer. A redirection system or redirector software program operating at the host system enables the user to redirect or mirror certain user-selected data items (or parts of data items) from the host system to the user's mobile data communication device upon detecting that one or more user-defined triggering events has occurred. Also operating at the host system are various sub-systems that may be configured to create triggering events, such as a screen saver sub-system or a keyboard sub-system, as well as sub-systems for repackaging the user's data items for transparent delivery to the mobile data device, such as a TCP/IP sub-system or one or more E-Mail sub-systems. Other sub-systems for creating triggering events and repackaging the user's data items could also be present at the host system. The host system also includes a primary memory store where the user's data items are normally stored.

Using the redirector program, the user can select certain data items for redirection, such as E-mail messages, calendar events, meeting notifications, address entries, journal entries, personal reminders etc. Having selected the data items for redirection, the user can then configure one or more event triggers to be sensed by the redirector program to initiate redirection of the user data items. These user-defined trigger points (or event triggers) include external events, internal events and networked events. Examples of external events include: receiving a message from the user's mobile data communication device to begin redirection; receiving a similar message from some external computer; sensing that the user is no longer in the vicinity of the host system; or any other event that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the examples of the types of user-defined events that can trigger the redirector program to push data items from the host to the mobile communication device. Although in a particular embodiment it is anticipated that the configuration that specifies which data items will be redirected and in what form will be set at the host system, such configuration may be set or modified through data sent from the mobile communications device.

In addition to the functionality noted above, the redirector program may provide a set of possibly software-implemented control functions for determining the type of mobile data communication device and its address, for programming a preferred list of message types that are to be redirected, and for determining whether the mobile communication device can receive and process certain types of message attachments, such as word processor or voice attachments. The determination of whether a particular mobile communication device can receive and process attachments is initially configured by the user of that mobile communication device at the host system. This configuration can be altered on a global or per message basis by transmitting a command message from the mobile communication device to the host system. If the redirector is configured so that the mobile data device cannot receive and process word processor or voice attachments, then the redirector routes these attachments to an external machine that is compatible with the particular attachment, such as an attached printer or networked fax machine or telephone. Other types of attachments could be redirected to other types of external machines in a similar fashion, depending upon the capabilities of the mobile communication device. For example, if a user is traveling and receives a message with an attachment that the user's mobile communication device can process or display, the user may send a command message from a mobile communications device to the host system indicating that that attachment is to be sent to a fax machine at a hotel where the user will be spending the evening. This enables the user to receive important E-mail attachments as long as the host system is provided with sufficient information about the destination where the attachment is to be forwarded.

Once an event has triggered redirection of the user data items, the host system may then repackage these items in a manner that is transparent to the mobile data communication device, so that information on the mobile communication device appears similar to information on the user's host system. One repackaging method includes wrapping the user data items in an E-mail envelope that corresponds to the address of the mobile data communication device, although, alternatively, other repackaging methods could be used, such as special-purpose TCP/IP wrapping techniques, or other methods of wrapping the user selected data items. The repackaging preferably results in E-mail messages generated by the user from the mobile communication device to be transmitted from the host system, thus enabling the user to appear to have a single E-mail address, such that the recipients of messages sent from the mobile communications device do not know where the user was physically located when the message was first sent. The repackaging also permits both messages to the mobile communication device and sent from the mobile communication device to be encrypted and decrypted as well as compressed and decompressed.

In an alternative system and method, the redirector program executes on a network server, and the server is programmed to detect numerous redirection event triggers over the network from multiple user desktop computers coupled to the server via a LAN. The server can receive internal event triggers from each of the user desktops via the network, and can also receive external event triggers, such as messages from the users' mobile data communication devices. In response to receiving one of these triggers, the server redirects the user's data items to the proper mobile data communication device. The user data items and addressing information for a particular mobile communication device can be stored at the server or at the user's PC. Using this alternative configuration, one redirector program can serve a plurality of users. This alternative configuration could also include an internet- or intranet-based redirector program that could be accessible through a secure webpage or other user interface. The redirector program could be located on an Internet Service Provider's system and accessible only through the Internet.

In another alternative embodiment, a redirector program operates at both the host system and at the user's mobile data communication device. In this configuration, the user's mobile communication device operates similarly to the host system described below, and is configured in a similar fashion to push certain user-selected data items from the mobile communication device to the user's host system (or some other computer) upon detecting an event trigger at the mobile communication device. This configuration provides two-way pushing of information from the host to the mobile communication device and from the mobile communication device to the host.

Referring now to the drawings, FIG. 1 is an example system diagram showing the redirection of user data items (such as message A or C) from a user's office PC (host system) 10A to the user's mobile data communication device 24, where the redirector software 12A is operating at the user's PC. Message A in FIG. 1 represents an internal message sent from desktop 26 to the user's host system 10A via LAN 14. Message C in FIG. 1 represents an external message from a sender that is not directly connected to LAN 14, such as the user's mobile data communication device 24, some other user's mobile communication device, or any user connected to the Internet 18. Message C also represents a command message from the user's mobile data communication device 24 to the host system 10A. As described in more detail in FIG. 3, the host system 10 preferably includes, along with the typical hardware and software associated with a workstation or desktop computer, the redirector program 12A, a TCP/IP subsystem 42, a primary message store 40, an E-mail subsystem 44, a screen saver subsystem 48, and a keyboard subsystem 46.

In FIG. 1, the host system 10A is the user's desktop system, typically located in the user's office. The host system 10A is connected to a LAN 14, which also connects to other computers 26, 28 that may be in the user's office or elsewhere. The LAN 14, in turn, is connected to a wide area network ("WAN") 18, preferably the Internet, which is defined by the use of the Transmission Control Protocol/Internet Protocol ("TCP/IP") to exchange information, but which, alternatively could be any other type of WAN. The connection of the LAN 14 to the WAN 18 is via high bandwidth link 16, typically a T1 or T3 connection. The WAN 18 in turn is connected to a variety of gateways 20, via connections 32. A gateway forms a connection or bridge between the WAN 18 and some other type of network, such as an RF wireless network, cellular network, satellite network, or other synchronous or asynchronous land-line connection.

In the example of FIG. 1, a wireless gateway 20 is connected to the Internet for communicating via wireless link 22 to a plurality of wireless mobile data communication devices 24. Also shown in FIG. 1 is machine 30, which could be a FAX machine, a printer, a system for displaying images (such as video) or a machine capable of processing and playing audio files, such as a voice mail system. The present system and method includes the ability to redirect certain message attachments to such an external machine 30 if the redirector program configuration data reflects that the mobile communication device 24 cannot receive and process the attachments, or if the user has specified that certain attachments are not to be forwarded to mobile communication device 24, even if such device can process those attachments. By way of example, consider an E-mail sent to a user that includes three attachments—a word processing document, a video clip and an audio clip. The redirection program could be configured to send the text of the E-mail to the remote device, to send the word processing document to a networked printer located near the user, to send the video clip to a store accessible through a secure connection through the internet and to send the audio clip to the user's voice mail system. This example is not intended to limit the breadth and scope of the invention, but rather to illustrate the variety of possibilities embodied in the redirection concept.

Figure 4:
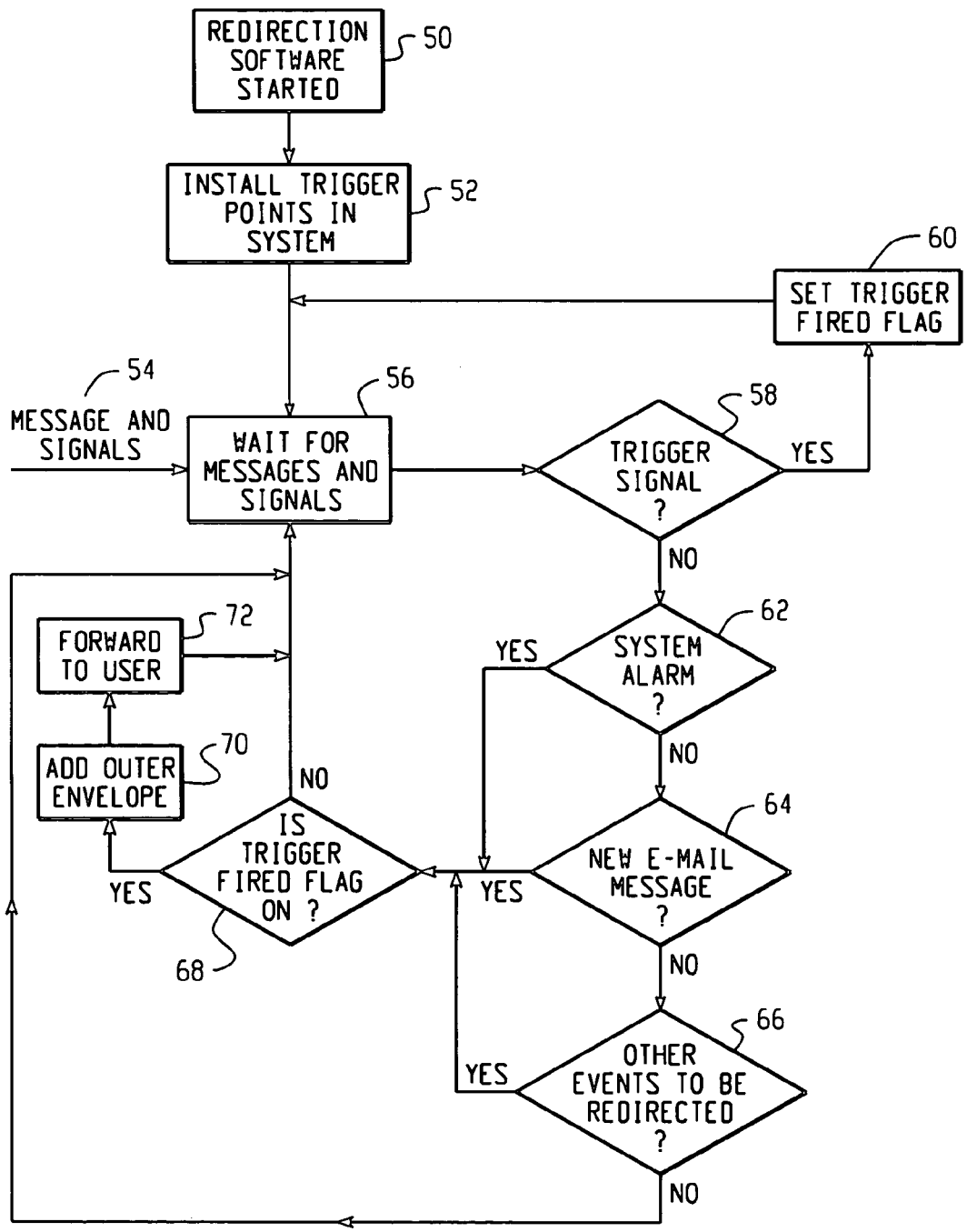
FIG. 4 is a flow chart showing the steps carried out by an example redirector software operating at the host system.

The mobile data communication device 24 may be a handheld two-way wireless paging computer, a wirelessly enabled palm-top computer, a mobile telephone with data messaging capabilities, or a wirelessly enabled laptop computer, but could, alternatively be other types of mobile data communication devices capable of sending and receiving messages via a network connection 22. Although the system may operate in a two-way communications mode, certain aspects of the invention could be beneficially used in a "one and one-half" or acknowledgment paging environment, or even with a one-way paging system. The mobile data communication device 24 may be configured, for example via software program instructions, to work in conjunction with the redirector program 12B to enable the seamless, transparent redirection of user-selected data items. FIG. 4 describes the basic method steps of an example redirector program, and FIG. 5 describes the steps of a corresponding program which may be operating at the mobile communication device 24.

In an alternative embodiment, the mobile communication device 24 also includes a redirector program. In this embodiment, user selected data items can be replicated from the host to the mobile communication device and vice versa. The configuration and operation of the mobile communication device 24 having a redirector program is similar to that described herein with respect to FIGS. 1-5.

A user can configure the redirector program 12A to push certain user-selected data items to the user's mobile data communication device 24 when the redirector 12A detects that a particular user-defined event trigger (or trigger point) has taken place. User-selected data items preferably include E-mail messages, calendar events, meeting notifications, address entries, journal entries, personal alerts, alarms, warnings, stock quotes, news bulletins, etc., but could, alternatively, include any other type of message that is transmitted to the host system 10A, or that the host system 10A acquires through the use of intelligent agents, such as data that is received after the host system 10A initiates a search of a database or a website or a bulletin board. In some instances, only a portion of the data item is transmitted to the mobile communication device 24 in order to minimize the amount of data transmitted via the wireless network 22. In these instances, the mobile communication device 24 can optionally send a command message to the host system to receive more or all of the data item if the user desires to receive it.

Among the user-defined event triggers that can be detected by the redirector program 12A are in the preferred embodiment external events, internal events and networked events. External events preferably include: (1) receiving a command message (such as message C) from the user's mobile data communication device to begin redirection, or to execute some other command at the host, such as a command to enable the preferred list mode, or to add or subtract a particular sender from the preferred list; (2) receiving a similar message from some external computer; and (3) sensing that the user is no longer in the vicinity of the host system; although, alternatively, an external event can be any other detectable occurrence that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the events that could be used to initiate replication of the user-selected data items from the host system 10 to the mobile communication device 24.

FIG. 1 shows an E-mail message A being communicated over LAN 14 from computer 26 to the user's desktop system 10A (also shown in FIG. 1 is an external message C, which could be an E-mail message from an Internet user, or could be a command message from the user's mobile communication device 24). Once the message A (or C) reaches the primary message store of the host system 10A, it can be detected and acted upon by the redirection software 12A. The redirection software 12A can use many methods of detecting new messages. One method of detecting new messages is using Microsoft's® Messaging API (MAPI), in which programs, such as the redirector program 12A, register for notifications or 'advise syncs' when changes to a mailbox take place. Other methods of detecting new messages could also be used, and will be described in further detail below.

Assuming that the redirector program 12A is activated, and has been configured by the user (either through the sensing of an internal, network or external event) to replicate certain user data items (including messages of type A or C) to the mobile communication device 24, when the message A is received at the host system 10A, the redirector program 12A detects its presence and prepares the message for redirection to the mobile communication device 24. In preparing the message for redirection, the redirector program 12A could compress the original message A, could compress the message header, or could encrypt the entire message A to create a secure link to the mobile communication device 24.

Also programmed into the redirector 12A is the address of the user's mobile data communication device 24, the type of device, and whether the device 24 can accept certain types of attachments, such as word processing or voice attachments. If the user's type of mobile communication device cannot accept these types of attachments, then the redirector 12A can be programmed to route the attachments to a fax or voice number where the user is located using an attached fax or voice machine 30.

The redirector may also be programmed with a preferred list mode that is configured by the user either at the host system 10A, or remotely from the user's mobile data communication device by transmitting a command message C. The preferred list contains a list of senders (other users) whose messages are to be redirected or a list of message characteristics that determine whether a message is to be redirected. If activated, the preferred list mode causes the redirector program 12A to operate like a filter, only redirecting certain user data items based on whether the data item was sent from a sender on the preferred list or has certain message characteristics that if present will trigger or suppress redirection of the message. In the example of FIG. 1, if desktop system 26 was operated by a user on the preferred list of host system 10A, and the preferred list option was activated, then message A would be redirected. If, however, desktop 26 was operated by a user not on the host system's preferred list, then message A would not be redirected, even if the user of the host system had configured the redirector to push messages of type A. The user of the host system 10A can configure the preferred list directly from the desktop system, or, alternatively, the user can then send a command message (such as C) from the mobile communication device 24 to the desktop system 10A to activate the preferred list mode, or to add or delete certain senders or message characteristics from the preferred list that was previously configured. It should be appreciated that a redirection program could combine message characteristics and preferred sender lists to result in a more finely-tuned filter. Messages marked as low priority or that are simple return receipts or message read receipts, for example, could always be suppressed from redirection while messages from a particular sender would always be redirected.

After the redirector has determined that a particular message should be redirected, and it has prepared the message for redirection, the software 12A then sends the message A to a secondary memory store located in the mobile communication device 24, using whatever means are necessary. In the preferred embodiment this method is to send the message A back over the LAN 14, WAN 18, and through the wireless gateway 20 to the mobile data communication device 24. In doing so, the redirector preferably repackages message A as an E-mail with an outer envelope B that contains the addressing information of the mobile communication device 24, although alternative repackaging techniques and protocols could be used, such as a TCP/IP repackaging and delivery method (most commonly used in the alternative server configuration shown in FIG. 2). The wireless gateway 20 requires this outer envelope information B in order to know where to send the redirected message A. Once the message (A in B) is received by the mobile communication device 24, the outer envelope B is removed and the original message A is placed in the secondary memory store within the mobile communication device 24. By repackaging and removing the outer envelope in this manner, the mobile communication device 24 appears to be at the same physical location as the host system 10, thus creating a transparent system.

In the case where message C is representative of an external message from a computer on the Internet 18 to the host system 10A, and the host 10A has been configured to redirect messages of type C, then in a similar manner to message A, message C would be repackaged with an outer envelope B and transmitted to the user's mobile communication device 24. In the case where message C is representative of a command message from the user's mobile communication device 24 to the host system 10A, the command message C is not redirected, but is acted upon by the host system 10A.

If the redirected user data item is an E-mail message, as described above, the user at the mobile communication device 24 sees the original subject, sender's address, destination address, carbon copy and blind carbon copy. When the user replies to this message, or when the user authors a new message, the software operating at the mobile communication device 24 adds a similar outer envelope to the reply message (or the new message) to cause the message to be routed first to the user's host system 10A, which then removes the outer envelope and redirects the message to the final destination, such as back to computer 26. In the preferred embodiment, this results in the outgoing redirected message from the user's host system 10A being sent using the E-mail address of the host mailbox, rather than the address of the mobile communication device, so that it appears to the recipient of the message that the message originated from the user's desktop system 10A rather than the mobile data communication device. Any replies to the redirected message will then be sent to the desktop system 10A, which if it is still in redirector mode, will repackage the reply and resend it to the user's mobile data device, as described above.

Figure 2:
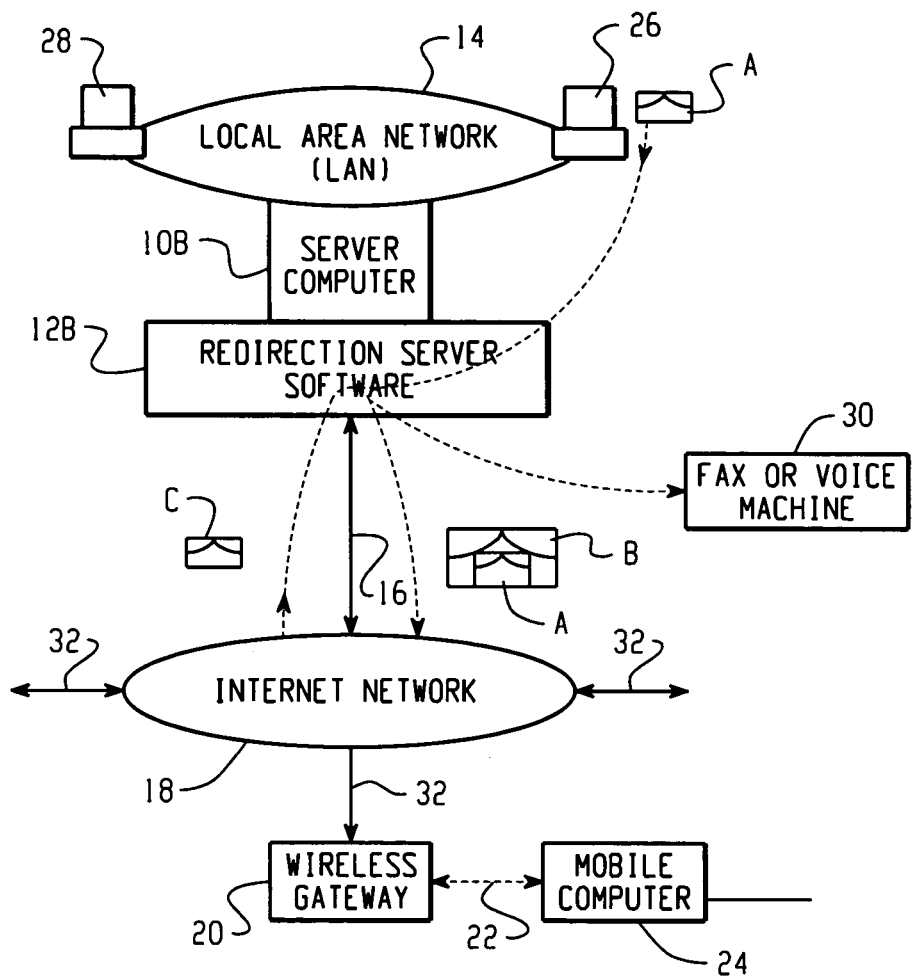
FIG. 2 is a system diagram showing the redirection of user data items from a network server (host system) to the user's mobile data communication device, where the redirector software is operating at the server.

FIG. 2 is an alternative system diagram showing the redirection of user data items from a network server 10B to the user's mobile data communication device 24, where the redirector software 12B is operating at the server 10B. This configuration is particularly advantageous for use with message servers such as a Microsoft® Exchange Server or a Lotus™ Domino™ Server, which are normally operated so that all user messages are stored in one central location or mailbox store on the server instead of in a store within each user's desktop PC. This configuration has the additional advantage of allowing a single system administrator to configure and keep track of all users having messages redirected. If the system includes encryption keys, these too can be kept at one place for management and update purposes.

In this alternative configuration, server 10B preferably maintains a user for each user's desktop system 26, 28, including information such as whether a particular user can have data items redirected, which types of message and information to redirect, what events will trigger redirection, the address of the users' mobile data communication device 24, the type of mobile communication device, and the user's preferred list, if any. The event triggers are preferably detected at the user's desktop system 26, 28 and can be any of the external, internal or network events listed above. The desktop systems 26, 28 preferably detect these events and then transmit a message to the server computer 10B via LAN 14 to initiate redirection. Although the user data items are preferably stored at the server computer 10B in this embodiment, they could, also or alternatively, be stored at each user's desktop system 26, 28, which would then transmit them to the server computer 10B after an event has triggered redirection. In the above example of a Lotus Domino Server, described in further detail below, a user's mail file may exist at both the server and a user's desktop computer system.

As shown in FIG. 2, desktop system 26 generates a message A that is transmitted to and stored at the host system 10B, which is the network server operating the redirector program 12B. The message A is for desktop system 28, but in this embodiment, user messages are stored at the network server 10B. When an event occurs at desktop system 28, an event trigger is generated and transmitted to the network server 10B, which then determines who the trigger is from, whether that desktop has redirection capabilities, and if so, the server (operating the redirector program) uses the stored configuration information to redirect message A to the mobile computer 24 associated with the user of desktop system 28.

As described above with reference to FIG. 1, message C could be either a command message from a user's mobile data communication device 24, or it could be a message from an external computer, such as a computer connected to the Internet 18. If the message C is from an Internet computer to the user's desktop system 28, and the user has redirection capabilities, then the server 10B detects the message C, repackages it using electronic envelope B, and redirects the repackaged message (C in B) to the user's mobile communication device 24. If the message C is a command message from the user's mobile communication device 24, then the server 10B simply acts upon the command message.

Figure 3:
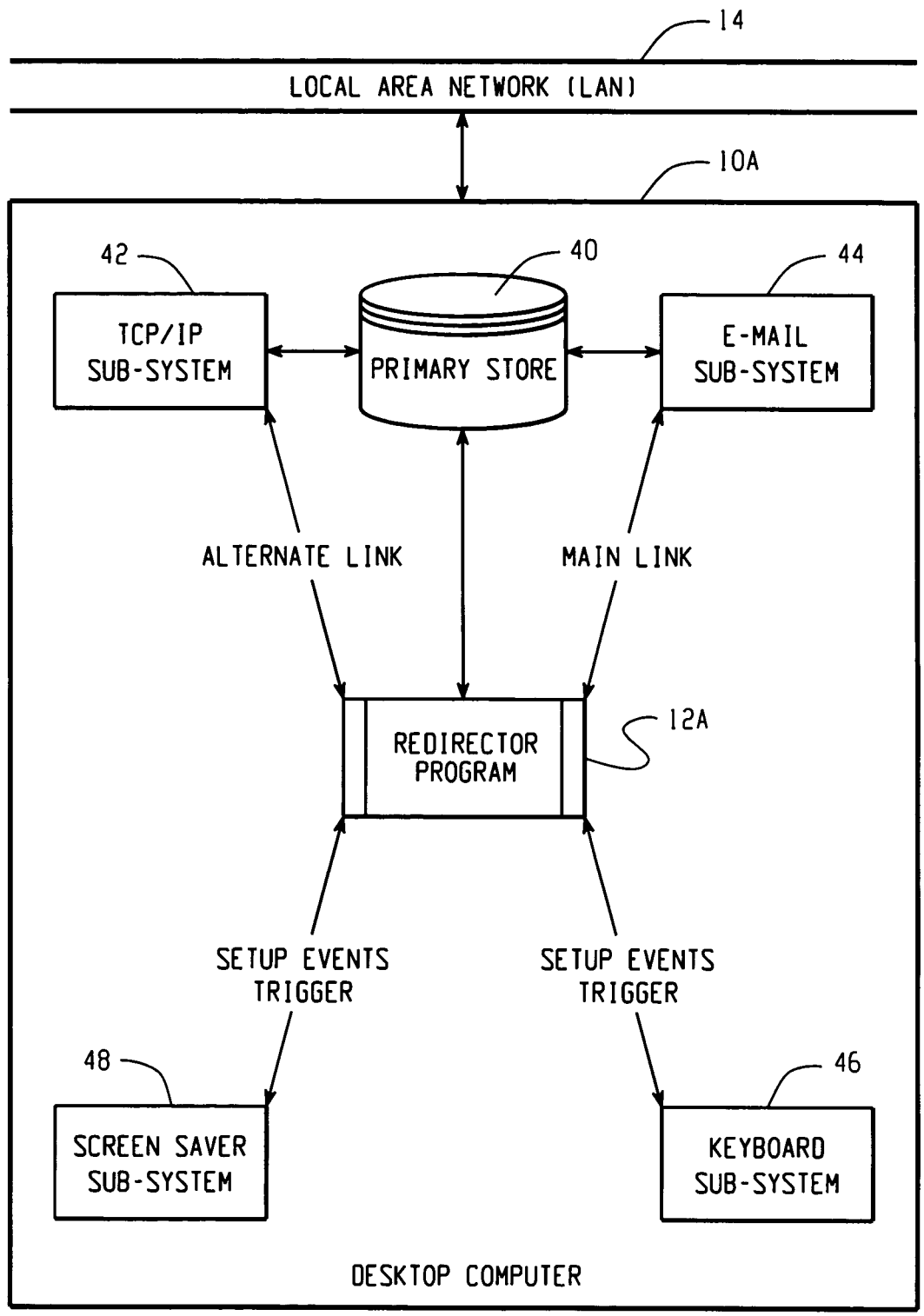
FIG. 3 is a block diagram showing the interaction of the redirector software with other components of the host system in FIG. 1 (the user's desktop PC) to enable the pushing of information from the host system to the user's mobile data communication device.

Turning now to FIG. 3, a block diagram showing the interaction of the redirector software 12A with additional components of the host system 10A of FIG. 1 (the desktop PC) to enable more fully the pushing of information from the host system 10A to the user's mobile data communication device 24 is set forth. These additional components are illustrative of the type of event-generating systems that can be configured and used with the redirector software 12A, and of the type of repackaging systems that can be used to interface with the mobile communication device 24 to make it appear transparent to the user.

The desktop system 10A is connected to LAN 14, and can send and receive data, messages, signals, event triggers, etc., to and from other systems connected to the LAN 14 and to external networks 18, 22, such as the Internet or a wireless data network, which are also coupled to the LAN 14. In addition to the standard hardware, operating system, and application programs associated with a typical microcomputer or workstation, the desktop system 10A includes the redirector program 12A, a TCP/IP sub-system 42, an E-mail sub-system 44, a primary data storage device 40, a screen saver sub-system 48, and a keyboard sub-system 46. The TCP/IP and E-mail subsystems 42, 44 are examples of repackaging systems that can be used to achieve transparency, and the screen saver and keyboard sub-systems 46, 48 are examples of event generating systems that can be configured to generate event messages or signals that trigger redirection of the user selected data items.

The method steps carried out by the redirector program 12A are described in more detail by way of illustrative example in FIG. 4. The basic functions of this program are to: (1) configure and setup the user-defined event trigger points that will start redirection; (2) configure the types of user data items for redirection and optionally configure a preferred list of senders whose messages are to be redirected; (3) configure the type and capabilities of the user's mobile data communication device; (4) receive messages and signals from the repackaging systems and the event generating systems; and (5) command and control the redirection of the user-selected data items to the mobile data communication device via the repackaging systems. Other functions not specifically enumerated could also be integrated into this program.

The E-Mail sub-system 44 is the preferred link to repackaging the user-selected data items for transmission to the mobile data communication device 24, and preferably uses industry standard mail protocols, such as SMTP, POP, IMAP, MIME and RFC-822, to name but a few. The E-Mail sub-system 44 can receive messages A from external computers on the LAN 14, or can receive messages C from some external network such as the Internet 18 or a wireless data communication network 22, and stores these messages in the primary data store 40. Assuming that the redirector program 12A has been triggered to redirect messages of this type, the redirector detects the presence of any new messages and instructs the E-Mail system 44 to repackage the message by placing an outer wrapper B about the original message A (or C), and by providing the addressing information of the mobile data communication device 24 on the outer wrapper B. As noted above, this outer wrapper B is removed by the mobile communication device 24, and the original message A (or C) is then recovered, thus making the mobile communication device 24 appear to be the desktop system 10A.

In addition, the E-Mail sub-system 44 receives messages back from the mobile communication device 24 having an outer wrapper with the addressing information of the desktop system 10A, and strips this information away so that the message can be routed to the proper sender of the original message A (or C). The E-Mail sub-system also receives command messages C from the mobile communication device 24 that are directed to the desktop system 10A to trigger redirection or to carry out some other function. The functionality of the E-Mail sub-system 44 is controlled by the redirector program 12A.

The TCP/IP sub-system 42 is an alternative repackaging system. It includes all of the functionality of the E-Mail sub-system 44, but instead of repackaging the user-selected data items as standard E-mail messages, this system repackages the data items using special-purpose TCP/IP packaging techniques. This type of special-purpose sub-system is useful in situations where security and improved speed are important to the user. The provision of a special-purpose wrapper that can only be removed by special software on the mobile communication device 24 provides the added security, and the bypassing of E-mail store and forward systems can improve speed and real-time delivery.

As described previously, the redirector program can be triggered to begin redirection upon detecting numerous external, internal and networked events, or trigger points. Examples of external events include: receiving a command message from the user's mobile data communication device 24 to begin redirection; receiving a similar message from some external computer; sensing that the user is no longer in the vicinity of the host system; or any other event that is external to the host system. Internal events could be a calendar alarm, screen saver activation, keyboard timeout, programmable timer, or any other user-defined event that is internal to the host system. Networked events are user-defined messages that are transmitted to the host system from another computer that is connected to the host system via a network to initiate redirection.

The screen saver and keyboard sub-systems 46, 48 are examples of systems that are capable of generating internal events. Functionally, the redirector program 12A provides the user with the ability to configure the screen saver and keyboard systems so that under certain conditions an event trigger will be generated that can be detected by the redirector 12A to start the redirection process. For example, the screen saver system can be configured so that when the screen saver is activated, after, for example, 10 minutes of inactivity on the desktop system, an event trigger is transmitted to the redirector 12A, which starts redirecting the previously selected user data items. In a similar manner the keyboard sub-system can be configured to generate event triggers when no key has been depressed for a particular period of time, thus indicating that redirection should commence. These are just two examples of the numerous application programs and hardware systems internal to the host system 10A that can be used to generate internal event triggers.

Figure 5:
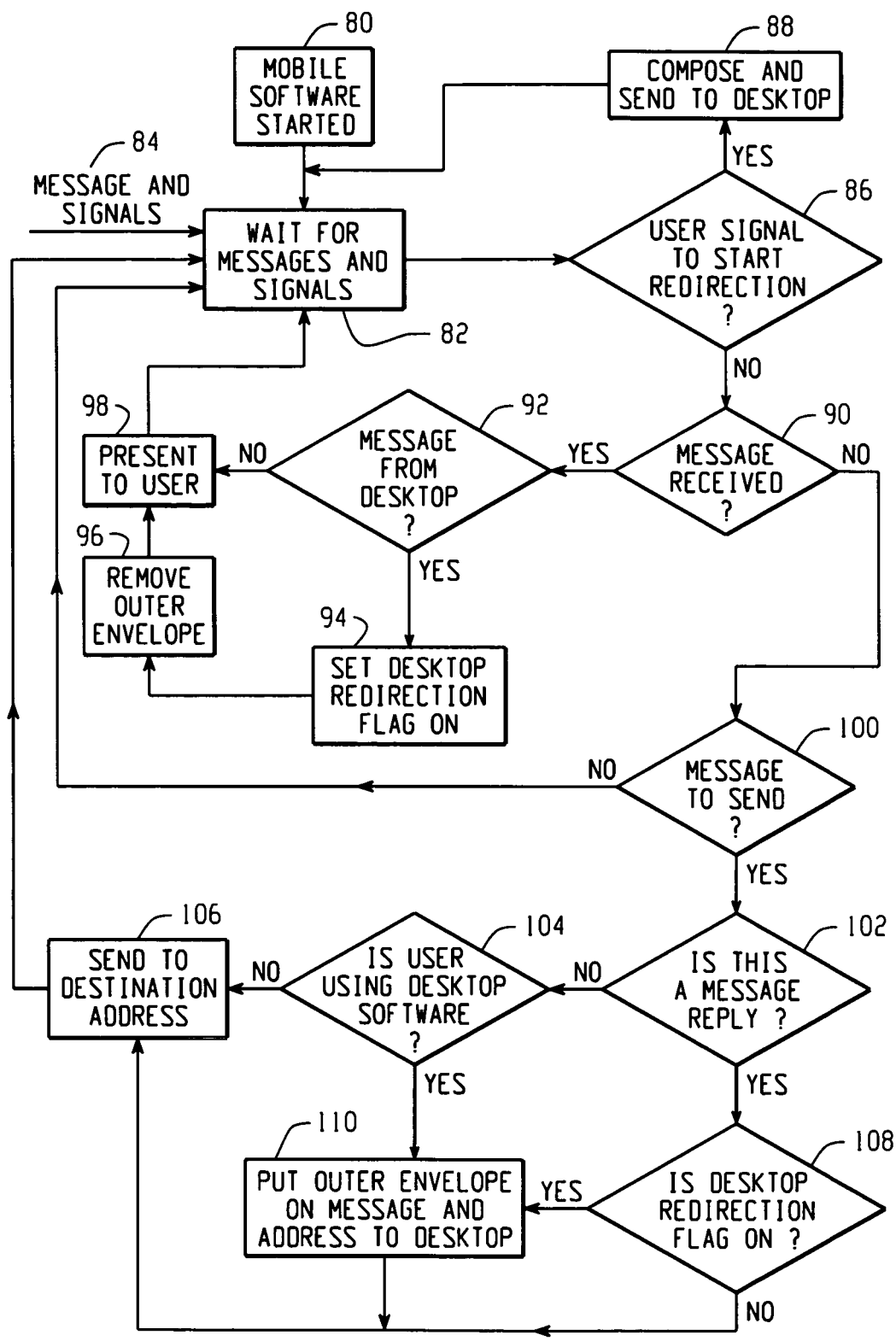
FIG. 5 is a flow chart showing an example of steps that may be carried out by the mobile data communication device to interface with the redirector software represented in FIG. 4, operating at the host system.

FIGS. 4 and 5, are flow charts showing steps that may be carried out, respectively, by the redirector software 12A operating at the host system 10A, and by the mobile data communication device 24 in order to interface with the host system. Turning first to FIG. 4, at step 50, the redirector program 12A is started and initially configured. The initial configuration of the redirector 12A includes: (1) defining the event triggers that the user has determined will trigger redirection; (2) selecting the user data items for redirection; (3) selecting the repackaging sub-system, either standard E-Mail, or special-purpose technique; (4) selecting the type of data communication device, indicating whether and what type of attachments the device is capable of receiving and processing, and inputting the address of the mobile communication device; and (5) configuring the preferred list of user selected senders whose messages are to be redirected.

FIG. 4 sets forth the basic steps of an example redirector program 12A assuming it is operating at a desktop system 10A, such as shown in FIG. 1. If the redirector 12B is operating at a network server 12B, as shown in FIG. 2, then additional configuration steps may be necessary to enable redirection for a particular desktop system 26, 28 connected to the server, including: (1) setting up a profile for the desktop system indicating its address, events that will trigger redirection, and the data items that are to be redirected upon detecting an event; (2) maintaining a storage area at the server for the data items; and (3) storing the type of data communication device to which the desktop system's data items are to be redirected, whether and what type of attachments the device is capable of receiving and processing, and the address of the mobile communication device.

Once the redirector program is configured 50, the trigger points (or event triggers) are enabled at step 52. The program 12A then waits 56 for messages and signals 54 to begin the redirection process. A message could be an E-Mail message or some other user data item than may have been selected for redirection, and a signal could be a trigger signal, or could be some other type of signal that has not been configured as an event trigger. When a message or signal is detected, the program determines 58 whether it is one of the trigger events that has been configured by the user to signal redirection. If so, then at step 60 a trigger flag is set, indicating that subsequently received user data items (in the form of messages) that have been selected for redirection should be pushed to the user's mobile data communication device 24.

If the message or signal 54 is not a trigger event, the program then determines at steps 62, 68 and 66 whether the message is, respectively, a system alarm 62, an E-Mail message 64, or some other type of information that has been selected for redirection. If the message or signal is none of these three items, then control returns to step 56, where the redirector waits for additional messages 54 to act upon. If, however the message is one of these three types of information, then the program 12A determines, at step 68, whether the trigger flag has been set, indicating that the user wants these items redirected to the mobile communication device. If the trigger flag is set, then at step 70, the redirector 12A causes the repackaging system (E-Mail or TCP/IP) to add the outer envelope to the user data item, and at step 72 the repackaged data item is then redirected to the user's mobile data communication device 24 via LAN 14, WAN 18, wireless gateway 20 and wireless network 22. Control then returns to step 56 where the program waits for additional messages and signals to act upon. Alternatively, after step 68, the program could, if operating in the preferred list mode, determine whether the sender of a particular data item is on the preferred list, and if not, then the program would skip over steps 70 and 72 and proceed directly back to step 56. If the sender was on the preferred list, then control would similarly pass to steps 70 and 72 for repackaging and transmission of the message from the preferred list sender.

FIG. 5 sets forth the method steps carried out by the user's mobile data communication device 24 in order to interface to the redirector program 12A. At step 80 the mobile software is started and the mobile communication device 24 is configured to operate with the host system, including, for example, storing the address of the user's desktop system 10A.

At step 82, the mobile communication device waits for messages and signals 84 to be generated or received. Assuming that the redirector software 12A operating at the user's desktop system 10A is configured to redirect upon receiving a message from the user's mobile communication device 24, at step 86, the user can decide to generate a command message that will start redirection. If the user does so, then at step 88 the redirection message is composed and sent to the desktop system 10A via the wireless network 22, through the wireless gateway 20, via the Internet 18 to the LAN 14, and is finally routed to the desktop machine 10A. In this situation where the mobile communication device 24 is sending a message directly to the desktop system 10A, no outer wrapper is added to the message (such as message C in FIGS. 1 and 2). In addition to the redirection signal, the mobile communication device 24 could transmit any number of other commands to control the operation of the host system, and in particular the redirector program 12A. For example, the mobile 24 could transmit a command to put the host system into the preferred list mode, and then could transmit additional commands to add or subtract certain senders from the preferred list. In this manner, the mobile communication device 24 can dynamically limit the amount of information being redirected to it by minimizing the number of senders on the preferred list. Other example commands include: (1) a message to change the configuration of the host system to enable the mobile communication device 24 to receive and process certain attachments; and (2) a message to instruct the host system to redirect an entire data item to the mobile communication device in the situation where only a portion of a particular data item has been redirected.

Turning back to FIG. 5, if the user signal or message is not a direct message to the desktop system 10A to begin redirection (or some other command), then control is passed to step 90, which determines if a message has been received. If a message is received by the mobile, and it is a message from the user's desktop 10A, as determined at step 92, then at step 94 a desktop redirection flag is set "on" for this message, and control passes to step 96 where the outer envelope is removed. Following step 96, or in the situation where the message is not from the user's desktop, as determined at step 92, control passes to step 98, which displays the message for the user on the mobile communication device's display. The mobile unit 24 then returns to step 82 and waits for additional messages or signals.

If the mobile communication device 24 determines that a message has not been received at step 90, then control passes to step 100, where the mobile determines whether there is a message to send. If not, then the mobile unit returns to step 82 and waits for additional messages or signals. If there is at least one message to send, then at step 102 the mobile determines whether it is a reply message to a message that was received by the mobile unit. If the message to send is a reply message, then at step 108, the mobile determines whether the desktop redirection flag is on for this message. If the redirection flag is not on, then at step 106 the reply message is simply transmitted from the mobile communication device to the destination address via the wireless network 22. If, however, the redirection flag is on, then at step 110 the reply message is repackaged with the outer envelope having the addressing information of the user's desktop system 10A, and the repackaged message is then transmitted to the desktop system 10A at step 106. As described above, the redirector program 12A executing at the desktop system then strips the outer envelope and routes the reply message to the appropriate destination address using the address of the desktop system as the "from" field, so that to the recipient of the redirected message, it appears as though it originated from the user's desktop system rather than the mobile data communication device.

If, at step 102, the mobile determines that the message is not a reply message, but an original message, then control passes to step 104, where the mobile determines if the user is using the redirector software 12A at the desktop system 10A, by checking the mobile unit's configuration. If the user is not using the redirector software 12A, then the message is simply transmitted to the destination address at step 106. If, however, the mobile determines that the user is using the redirector software 12A at the desktop system 10A, then control passes to step 110, where the outer envelope is added to the message. The repackaged original message is then transmitted to the desktop system 10A at step 106, which, as described previously, strips the outer envelope and routes the message to the correct destination. Following transmission of the message at step 106, control of the mobile returns to step 82 and waits for additional messages or signals.

Figure 6:
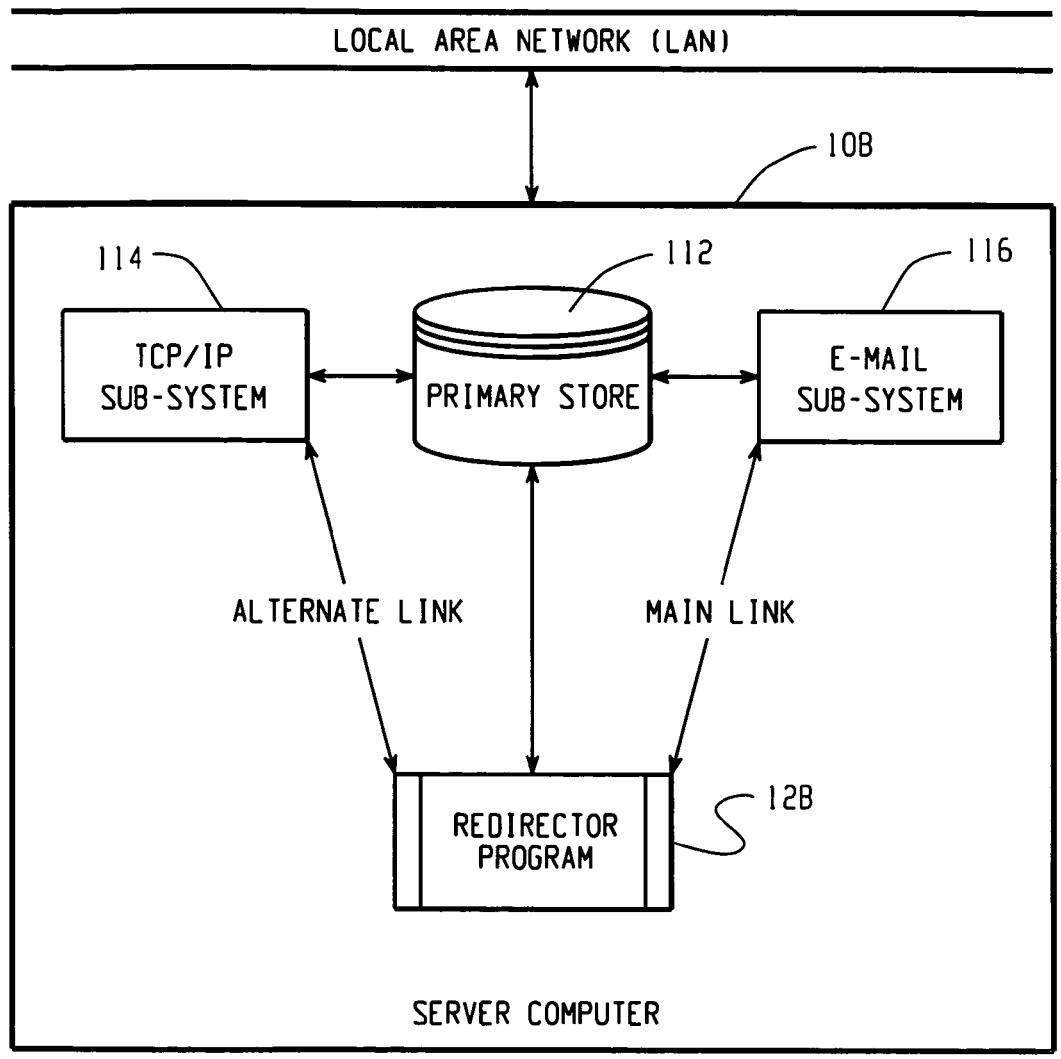
FIG. 6 is a block diagram showing the interaction of a server-based redirection system with other components of the host system in FIG. 2 to enable the pushing of information from the server to the user's mobile data communication device.

An example of data item redirection from a server such as shown in FIG. 2 will now be described in detail. FIG. 6 is a block diagram showing the interaction of a server-based redirection system with other components of the host system in FIG. 2 to enable the pushing of information from the server computer 10B to the user's mobile data communication device. In FIG. 6, basic components of the server computer 10B of FIG. 2 are shown. As in FIG. 3, a server-based redirection system may include a primary store 112, a TCP/IP sub-system 114 and an E-mail sub-system 116. It should be noted that the server computer 10B in FIG. 6 may also include standard hardware, operating system, and software application programs associated with a typical server computer.

Although a server computer 10B may also include a screen and a keyboard, triggering event generation associated with a screen saver sub-system 48 and keyboard sub-system as described above would normally not be enabled at a server system. This type of triggering event generation may instead be enabled at each user's desktop system. When such a triggering event has been detected at a user's desktop computer, the server computer 10B may be informed of the detection of the triggering event by transmission of a message from the desktop system to the server computer 10B. However, it is contemplated that other redirection trigger events may be generated and/or detected at the server computer 10B.

The basic functions of the server-based redirector program 12B are substantially to those of the desktop redirector program 12A described above, although some of the redirection settings may possibly be managed by a user from a desktop computer system configured for operation in the LAN 14. For example, the server computer 10B may store information relating to user-defined event trigger points that will start redirection, the types of user data items for redirection, a preferred list of senders whose messages are to be redirected, and the type and capabilities of the user's mobile data communication device, but the actual settings may be configured by a user at a desktop computer system. However, actual redirection functions such as redirecting messages to mobile communication devices and receiving messages from mobile data communication devices will normally be performed by the redirector program 12B. Repackaging, compression, encryption and corresponding reverse operation may also be associated with the server-based redirector program 12B. Other functions not specifically enumerated could also be integrated into this program.

Since data item redirection has been described in detail above, and server-based redirection operates in a substantially similar manner which will be apparent from the foregoing description, server-based redirection will be described only briefly. As above, the E-Mail sub-system 116 is one possible link for transmitting data items to mobile data communication devices. The E-Mail sub-system 116 can receive messages from computers on the LAN 14, or from some external network such as the Internet 18 or a wireless data communication network 22 (FIG. 2), and stores these messages in the primary data store 112. Assuming that the redirector program 12B has been triggered to redirect messages of this type, the redirector detects the presence of any new message and instructs the E-mail sub-system 116 to repackage the message by placing an outer wrapper around the original message, and by providing addressing information of the mobile data communication device associated with an intended recipient desktop computer system or E-mail addressee on the outer wrapper. This outer wrapper is then removed when the message is received by the mobile communication device, and the original message is then recovered, thus making the mobile communication device appear to be the intended destination desktop system. The redirector program 12B also receives messages sent from mobile communication devices, possibly through the E-mail sub-system 116. When a message from a mobile communication device is a reply to an earlier redirected message, the reply message preferably has an outer wrapper with the addressing information of an associated desktop system, and the E-mail sub-system 116 strips this information away so that the message can be routed to the sender of the original message. The E-Mail sub-system 116 may also receive command messages from mobile communication devices, for example to trigger redirection or to carry out some other function.

The TCP/IP sub-system 114 is an alternative repackaging system that may instead be used by the redirector program 12B. In one embodiment, communications between the redirector program 12B and the wireless gateway 20 may be effected using TCP/IP-based repackaging at the server 12B. This type of special-purpose sub-system is useful in situations where security and improved speed are important to the user. The provision of a special-purpose wrapper that can only be removed by special software on the mobile communication device 24 provides the added security, and the bypassing of E-mail store and forward systems can improve speed and real-time delivery.

Figure 7:
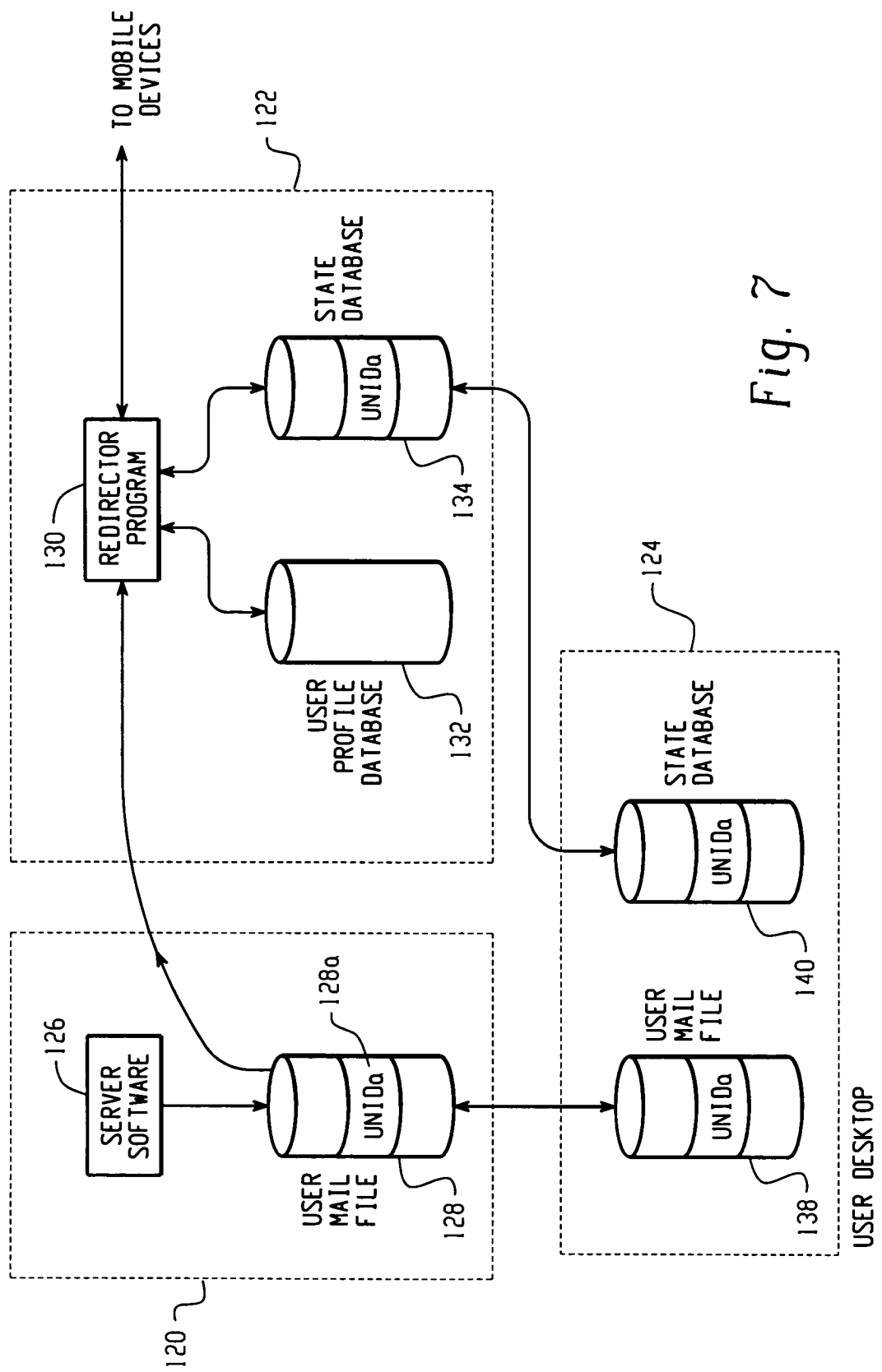
FIG. 7 is a block diagram illustrating various components associated with a server-based redirection system such as shown in FIG. 6.

In the example system of FIG. 6, all server-based components are shown as residing on a single server computer 10B. However, it should be apparent that, particularly in larger systems, a server computer on which a redirector program is running may operate in conjunction with other server computers, such that one or more of the sub-systems shown in FIG. 6 may be distributed among several server computers. Such a system is shown in FIG. 7. FIG. 7 is a block diagram illustrating various components associated with a server-based redirection system such as shown in FIG. 6.

In the system of FIG. 7, two servers computers 120 and 122 are shown. Redirection system components could also be implemented on more or fewer server computers, and functionality may be distributed differently than specifically shown in FIG. 7. The server computer 120 is analogous to a combination of the E-mail sub-system 116 and the primary store 112 in FIG. 6. The server computer 120 includes a server software component 126, preferably including at least a messaging software application or other software that generates, receives or otherwise manages user data items, and a data store 128 for storing such data items. In the example system of FIG. 7, the data store is shown as a user mail file. One example of such a user mail files exists in an E-mail system supported by a Lotus Domino Server. Data items such as 128a associated with a user having an account on the server 120 are normally stored in the user mail file 128. Although only a single user mail file is shown in FIG. 7, those skilled in the art will appreciate that the server computer 120 would typically include a user mail file for each user. In a Lotus Domino mail file, each data item is typically indexed with a unique identifier (UNID), such as UNIDa for data item 128a.

The server computer 122, comprising a redirector program 130, performs the functions of the redirector program 12B described above with reference to FIG. 6. When redirection for a particular user is activated, by detection of a triggering event at the user's desktop computer for example, the redirector program 130 detects new data items that should be redirected, repackages and possibly compresses and encrypts the data items, and sends the data items to the user's mobile communication device through the wireless gateway 20 (see FIG. 2). The repackaging, as described above, may be performed by a messaging application in the server computer 120, or by a TCP/IP or other transport sub-system. The particular repackaging sub-system has not been shown in FIG. 7 primarily to avoid congestion in the drawing. For the purposes of illustration, the repackaging is described below as a function of the redirector program 130, although it should be appreciated that repackaging could be performed by another component associated with the server computer 120, the server computer 122, or possibly a further server computer.

As described above, detection of new data items via MAPI involves detection of advise syncs generated by a messaging system when new data items arrive. However, such a non-intrusive detection scheme is not supported by all messaging systems. An alternate detection scheme must be used, for example, in Lotus Domino systems, in which no advise sync or similar new data item notification is available.

Although the server software component 126 and/or mail file 128 may be periodically polled or queried in order to detect new data items, some mechanism should also be implemented to indicate that a data item has already been processed by redirector program component 130 to ensure that data items are not redirected multiple times.

In one known system, this has been accomplished by attaching one or more indicators to each new mail file entry when it is detected. Typically, host systems usually comprise an e-mail server and a data item store, such as a database, in which data items related to e-mail communications or other communications are stored. While some host systems provide for modification of the data item store by the redirector program, other host systems do not allow such modifications. In the event that the redirector program modifies the data store, the data store may be corrupted.

Thus, in the embodiment of FIG. 7, adding such an indicator modifies the entry 128a in the mail file and results in modification of other parts of the message not directly related to the additional properties themselves, to the mail file 128. Subsequent operations on the new "modified" message are therefore correlated to the new mail file entry and UNID, and not the original file entry. This may result in such problems as digital signature verification failures for modified messages and synchronization of mail files between a user's desktop system 124, the server 120 and the user's mobile communication device 24. For example, because different UNIDs are associated with the original mail file entry and the mail file entry that was processed by the redirector program 130, messages that have been read at the mobile communication device might be shown as unread at the server computer 120 and the desktop computer 124 when the user accesses the server 120.

In order to overcome these problems, the redirector program 130 creates a state database 134 for each mobile communication device user that has been enabled for data item redirection from the server computer 120. A user profile database 132 stores user information for all such users, including for example data item types selected for redirection, preferred message sender lists and the like described above. When a user profile is added to the database 132, a new state database 134 is added to the server computer 122. The redirector program 130 accesses the state database 134 associated with the user to determine a redirection status of a data item. Redirection status may include redirect, in which case the redirector program 130 redirects the data item to the mobile communication device 24; no redirect, in which case the redirector program 130 does not redirect the data item to the mobile communication device 24; partial redirect, in which case the redirector program 130 redirects a subset of the data item to the mobile communication device 24; and the like.

When a new data item 128a is received and stored in the user mail file 128, a mail identifier is created to reference the new data item 128a. When a new data item 128a is detected in a user mail file 128, such as by querying or polling the server software component 126 and/or user mail file 128, the data item 128a, or at least the UNID portion of the entry, is retrieved by the redirector program 130 and stored to the user's state database 134. Since the UNID of the data item stored in the state database 134 and the mail file 128 is the same, UNIDa, the redirector program 130 provides a correlation between original and redirected data items. The redirector program 130 can thereby determine which mail file entries have been processed, without changing mail file entries, by consulting the user's state database 134. A data item associated with the mail file entry 128a may then be retrieved from the user mail file 128 using the UNIDa and redirected to the user's mobile communication device, as described above. In another embodiment, the redirector program 130 may also store the data item 128a in the user's state database 134 and retrieve the data item from the state database 134.

The redirector program 130 can also add any indicators or further information to the state database entries, including for example custom information associated with a transport mechanism or communication system through which data items are sent to the mobile communication devices, without corrupting file entries in a user's mail file 128.

The state database 134 also provides for such functionality as replying to redirected data items from a mobile communication device without having to retransmit an entire redirected data item 128 from the mobile communication device 24. A reply function on a mobile communication device 24 may for example be configured to insert a redirected data item identifier used in the user state database 134, instead of the entire redirected message, into a reply message for transmission to the redirector program 130. This message identifier may then be used by the redirector program 130 to determine the corresponding UNIDa of the redirected message, which may in turn be used to find the original message in the user's mail file 128 or state database 134 if the state database stores the data item. The original message may then be inserted into the reply message.

The state database 134 may also be used to store indications of data item processing operations performed at a user's mobile communication device 24. The status information may be associated with a UNID and stored in the state database 134. Such status information may include data indicating that the data item 128 is not to be processed and sent to the mobile communication device 24, or that the data item 128 has been processed and sent to the mobile communication device 24. Status information may also include status information from the mail file 128, such as data indicating that the data item 128 has been forwarded, is a reply message, or is stored in a certain folder/file location. Other status information may also be included. Thus, when a user reads a redirected data item at the device 24 for example, a signal may be returned to the redirector program 130, which may set a flag or other indicator in the corresponding state database entry. Deletion of a data item at a mobile communication device 24 may be similarly updated in the state database 134. This would allow a user to replicate the server's mail file 128 and the state database 134 to a desktop system 124, as indicated at 138 and 140, to thereby perform off-line data item synchronization between a local copy of the mail file 138 and the state database 140, such that the local mail file reflects device operations. This is advantageous in that network-intensive mail file synchronization can be reduced to less intensive so-called "delta" synchronization, in which only changes need be updated between the desktop system 124 and server computer 120. The UNID of any data item such as UNIDa of data item 128a, is maintained throughout all system components, including server computers 120 and 122, as well as the desktop system 124.

As described above, the amount of data transferred to a mobile communication device may be limited. Relatively long data items may be forwarded in portions of a predetermined size, with each sequential portion being forwarded only when requested by the user. This feature may also be supported by the state database arrangement shown in FIG. 7. An entry in a state database 134 can be modified by the redirector program 130 to indicate which portion(s) of a data item have already been forwarded to a mobile communication device 24 and which portion(s) are still pending. Such changes in a state database such as 134 do not affect the user mail file 128 at the server computer 120.

Although described primarily in the context of a mail file 128, the redirection system shown in FIG. 7 may also be applied to data items such as calendar appointments, reminders, and other data items described above.

Figure 8:
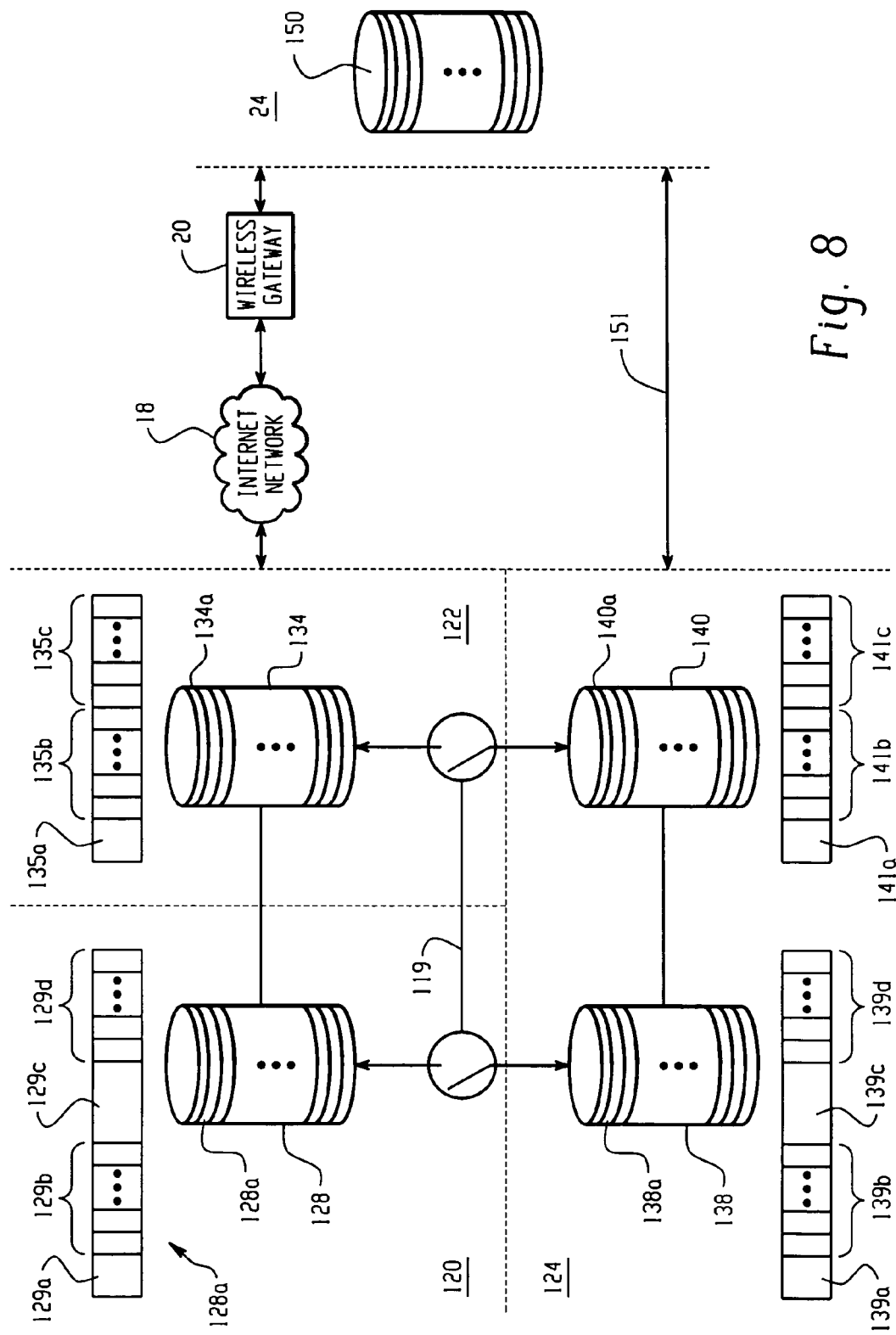
FIG. 8 is a block diagram illustrating an embodiment that includes databases associated with the server-based redirection system.

FIG. 8 is a block diagram illustrating an embodiment that includes databases associated with the server-based redirection system. In this embodiment, the mail file 128 is realized by a database 128. Each illustrative data item 128a of the mail database 128 may include a mail database identifier 129a, status fields 129b, message data 129c, and attachment data 129d. The mail database identifier 129a is an identifier by which the data item 128a may be addressed or accessed in the mail database 128. The status fields 129b comprise data indicating the status of data item 128a such as read, unread, forwarded, replied to, urgent, etc., if the data item 128a is an e-mail message, for example. The message data 129c comprises the message to be communicated by the data item, such as text data if the data item is an e-mail message, for example. The attachment data 129d comprises one or more attachments included with the data item, such as a word processing document that may be attached to an e-mail message, for example.

The state database 134 includes a corresponding record 134a for the data item 128a. The corresponding record 134a comprises a redirection record associated with the corresponding data item 128a stored in the mail database 128. Each illustrative record 134a includes a corresponding mail database identifier 135a, and may also include status fields 135b and process fields 135c. The mail database identifier 135a corresponds to the mail database identifier 129a. Thus, by accessing the mail database identifier 135a, the redirector program 130 can access the corresponding data item 128a stored in the mail database 128. The status fields 135b comprise data indicating the status of data item 128a such as read, unread, forwarded, replied to, urgent, etc., if the data item 128a is an e-mail message, for example. The process fields 135c comprises data indicating redirector processing steps associated with the data item 128a. Illustrative process fields include a transmission identifier and a message status. For example, if the redirector program 130 determines that the data item is not to be forwarded to the mobile communication device 24, the message status may include data indicating that no operation is to be carried out on the data item 128a. Alternatively, if the redirector program 130 determines that the data item is to be forwarded to the mobile communication device 24, the redirector program may assign a transmission identifier that corresponds to the mail database identifier 135a, and the message status may thereafter include data indicating the data item 128a has been transmitted to the mobile communication device 24.

The desktop system 124 includes a local mail database 138 and a local state database 140. The local mail database 138 and the local state database 140 are created on the desktop system 124 by a replication process, and comprise a copy of the data stored in the mail database 128 and the state database 134. The replication process occurs when the desktop system 124 is in communication with the server computers 120 and 122 via connection 119. Creation of the local mail database 138 and the local state database 140 allows the user of the desktop system 124 to process existing data items stored in the local mail database 138 and generate addition data items to be stored in the local mail database 138. For example, if the desktop system 124 is realized on a laptop computer, the user may remotely connect to the servers 120 and 122, replicate the mail database 128 and the state database 134 by creating or updating the local mail database 138 and the local state database 140. Thereafter, the user may disconnect from the servers 120 and 122 and process existing data items stored in the local mail database 138 and generate addition data items to be stored in the local mail database 138.

During this time, the user may also send and receive data items using the mobile communication device 24. These data items and corresponding status are stored in a data store 150 of the mobile communication device. Additionally, the user may desire that the data items stored in the data store 150 of the mobile communication device 24 be synchronized with the local mail database 138 and the local state database 140. The user may connect the mobile communication device 24 to the desktop system 124 via a link 151. In one embodiment, the link 151 comprises a mating device coupled to the desktop system 124 and operable to receive the mobile communication device 24.

A synchronization program executable on the desktop system 124 is operable to synchronize the data store 150 with the local mail database 138 and the local state database 140. Thus, the status of data items stored in the data store 150 and the corresponding operations performed are synchronized with the status of data items stored in the local mail database 138 and the local state database 140. Accordingly, the mobile communication device 24 may be synchronized with the desktop system 124 even when the desktop system 124 is not in communication with the servers 120 and 122.

At a later time, the user may then reconnect to the servers 120 and 122 and synchronize the mail database 128, the state database 134, the local mail database 138 and the local state database 140. Additionally, the synchronization program executable on the desktop system 124 is further operable to synchronize the data store 150 with the mail database 128 and the state database 134 if connected to the desktop system 124 by the link 151 when the desktop system 124 is connected to the servers 120 and 122.

Synchronizing the mobile communication device 24 with the desktop system 124 when the desktop system 124 is not in communication with the servers 120 and 122 avoids duplicative operations on the desktop system 124 and the mobile communication device 24 upon later synchronization with mail database 128 and the state database 134. For example, if the user deletes a data item from the data store 150 of the mobile communication device 24, synchronizing the mobile communication device 24 with the desktop system 124 will likewise result in the data item being deleted from the local mail database 138, as will its corresponding data stored in the local state database 140. When the user later reconnects to the servers 120 and 122, the corresponding data item will likewise be deleted from the mail database 128 as will its corresponding data stored in the state database 134.

The synchronization function may also be configured by the user so that only changes on the desktop system 124 are synchronized with the mobile communication device 24. Thus, the desktop system 124 is not synchronized to changes on the mobile communication device 24, while the mobile communication device 24 is synchronized to changes made on the desktop system 124. Other synchronization configurations may also be implemented.

Figure 9:
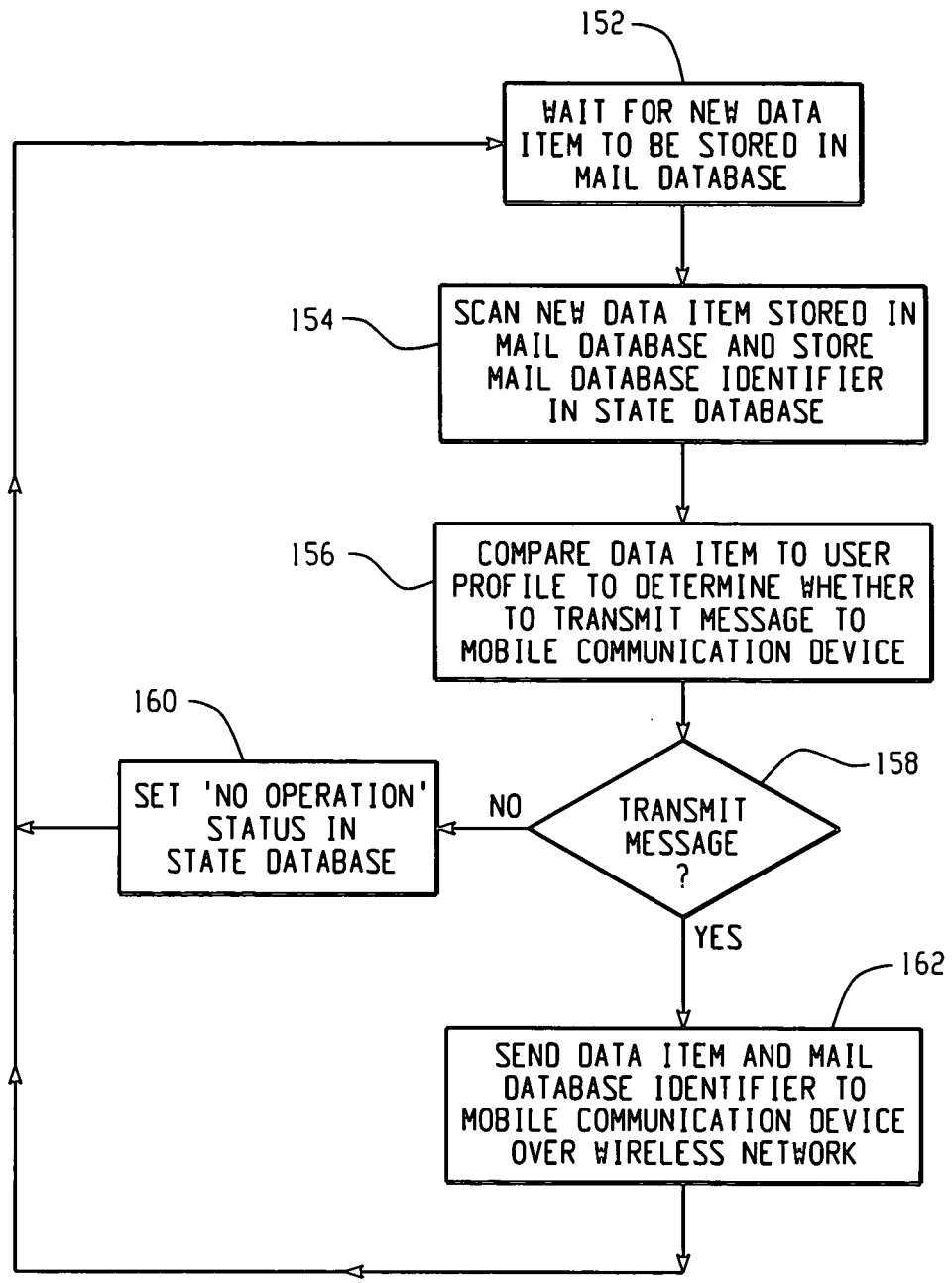
FIG. 9 is a flow chart showing an example of steps that may be carried out by the redirector software operating at the host system and utilizing a state database.

The redirector program 130 accesses the mail database 128 and the state database 134 to manage the data items stored in the mail database 128. FIG. 9 provides a flow chart showing an example of steps that may be carried out by the redirector program 130 operating at the host system and utilizing a state database 134. In step 152, the redirector program waits for a new data item 128a to be stored in the mail database 128. When a new data item 128a is stored in the mail database 128, a corresponding mail database identifier 129a is created. In step 154, the redirector program 130 scans the new data item 128a stored in the mail database 128, creates a corresponding record 134a in the state database 134, and stores the mail database identifier 129a in the mail identifier field 135a.

The data item 128a is then compared to the user profile stored in the user profile database 132 to determine whether to transmit the data item 128a to the mobile communication device 24, as shown in step 156. If, in step 158, the redirector program 130 determines that the data item 128a is not to be transmitted to the mobile communication device 24, then a "no operation" status is set in one of the process fields 135c of the corresponding record 134a stored in the state database 134, as shown in step 160.

On the other hand, if the redirector program 130 determines that the data item 128a is to be transmitted to the mobile communication device 24, then the data item 128a and the mail database identifier 135a are transmitted to the mobile communication device 24 over a wireless network, as shown in step 162.

In another embodiment, only a subset of the data item 128a is transmitted to the mobile communication device 24. The subset includes a portion of the message data 129c, thus limiting the bandwidth requirements between the redirector program 130 and the mobile communication device 24.

Often, the mail database identifier 128a may be a large data structure, e.g., 64 bytes in length. To further conserve bandwidth, in yet another embodiment, a transmission identifier is stored in one of the process fields 135c and is associated with the mail database identifier 135a stored in the state database 134. The transmission identifier is a smaller data structure than the mail database identifier 128a, and is transmitted with the data item 128a, or the portion thereof transmitted.

Figure 10:
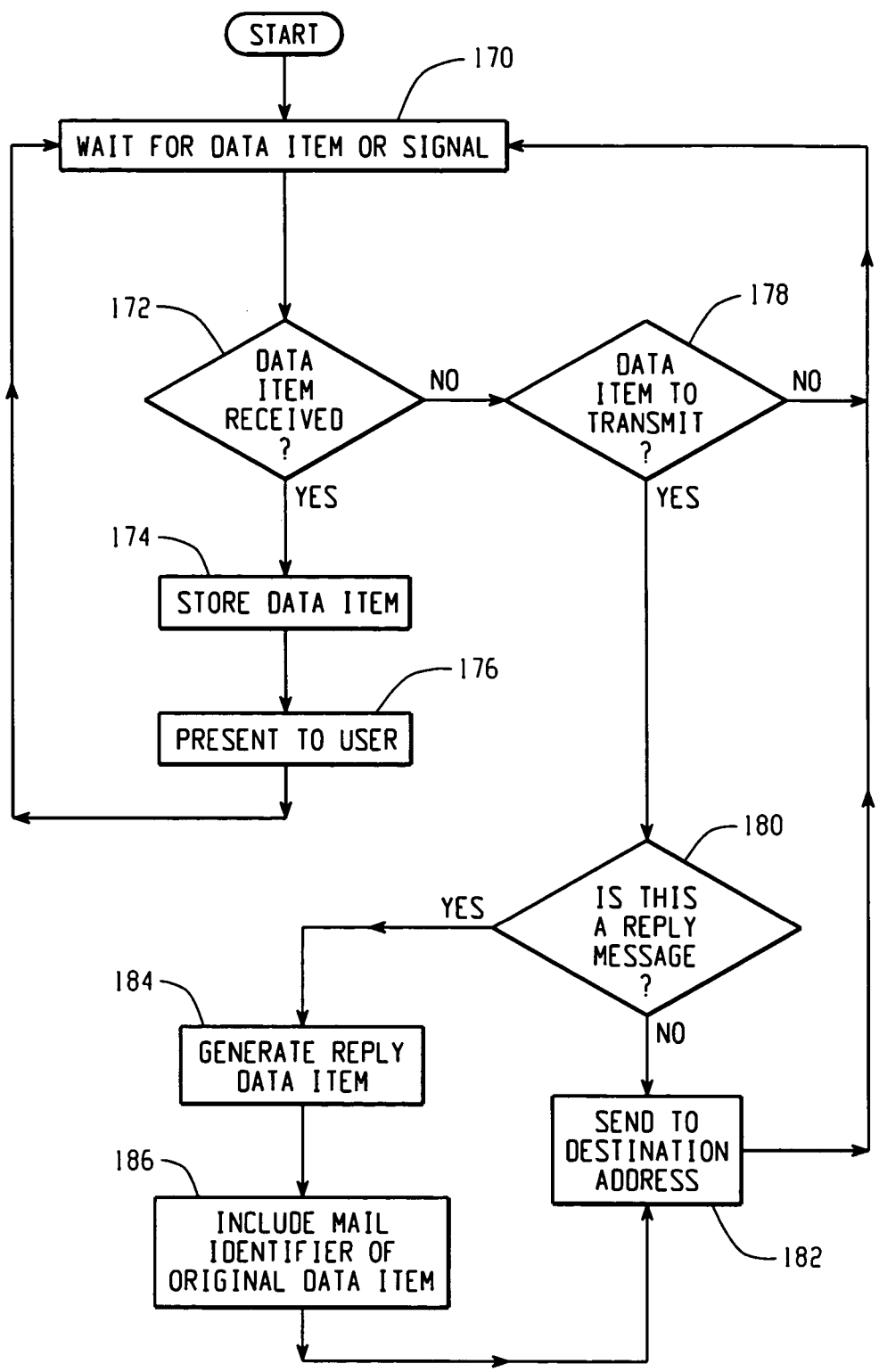
FIG. 10 is a flow chart showing an example of steps that may be carried out by the mobile data communication device to interface with the redirector software utilizing the state database.

The data item 128a and the corresponding mail database identifier 128a are thereafter received by the mobile communication device 24. FIG. 10 provides a flow chart showing an example of steps that may be carried out by the mobile data communication device 24 to interface with the redirector software 130 utilizing the state database 134. In step 170, the mobile communication device 24 waits for the reception of a data item or signal input. In step 172, the mobile communication device 24 determines if either a data item or signal has been received. If a data item has been received, then the mobile communication device 24 stores the data item in the data store 150 in step 174, and presents the data item to the user in step 176.

However, if in step 172 a signal input is detected, the mobile communication device 24 determines in step 178 whether there is a data item to transmit over the wireless network 22. If there is a data item to transmit, the mobile communication device 24 then determines in step 180 whether the data item is a reply message. If the data item is not a reply message, then the mobile communication device 24 transmits the data item to the destination address as shown in step 182.

However, if the mobile communication device 24 is to transmit a reply message, then in step 184 the reply data is generated. Reply data may comprise a reply text message input by the user, a forwarding destination addresses, and the like. In step 186, the mobile communication device 24 includes the mail identifier 128a of the original data item to which the reply message is being generated, and then the mobile communication device 24 transmits the data item and the mail database identifier as shown in step 182.

Figure 11:
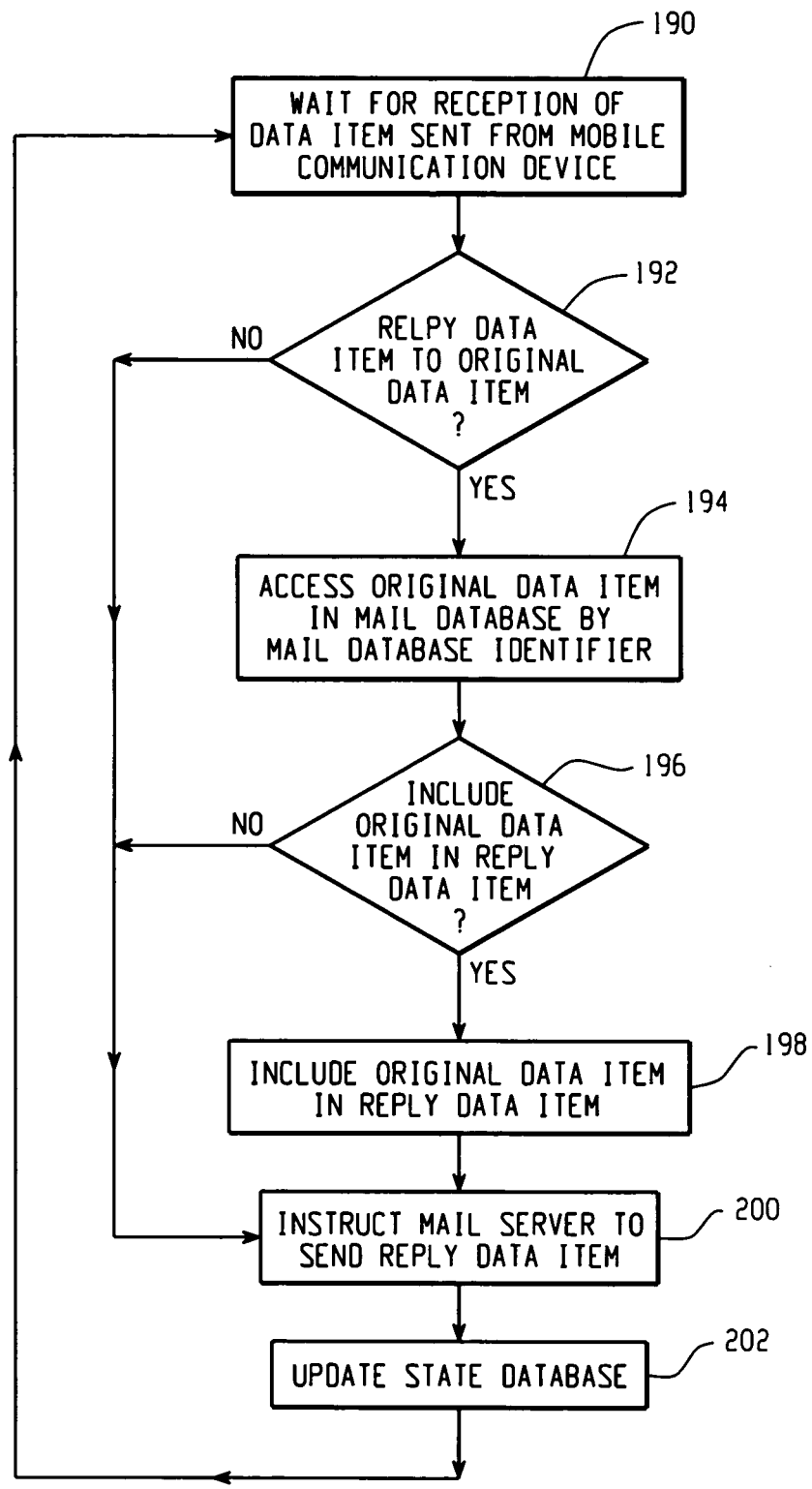
FIG. 11 is a flow chart showing an example of steps that may be carried out by the redirector software utilizing the state database and in response to receiving a data item from the mobile communication device.

The original data item to which the reply message is being generated need not be included in the transmission, as the redirector program 130 is operable to instruct the mail server 126 to generate a reply data item that includes the original data item and the reply data transmitted from the mobile communication device 24. FIG. 11 provides a flow chart showing an example of steps that may be carried out by the redirector program 130 utilizing the state database 134 and in response to receiving a data item from the mobile communication device 24. In step 190, the redirector program 130 waits for the reception of a data item sent from the mobile communication device 24. Upon receiving the data item from the mobile communication device 24, the redirector program 130 in step 192 determines whether the data item is a reply data item to an original data item. If the data item is a reply data item to an original data item, then in step 194 the redirector program 130 accesses the original data item in the mail database 128 by the corresponding mail database identifier 129a, which is stored in the state database 134.

In step 196, the redirector program 130 determines whether the original data item is to be included with the reply data item. If the original data item is to be included with the reply data item, then the redirector program 130 instructs the mail server 126 to include the original data item in the reply data item in step 198. In step 200, the redirector program instructs the mail server 126 to send the reply data item to the destination address. Finally, in step 202, the state database 134 is updated to reflect the current status of the data item stored in the mail database 128. Illustratively, if the data item is an original e-mail message to which a reply e-mail message has been generated that includes the original e-mail message, the state database 134 will include a first record corresponding to the original e-mail message and that a reply has been sent, and a second record corresponding to the reply e-mail message, which is also stored in the mail database 128.

Figure 12:
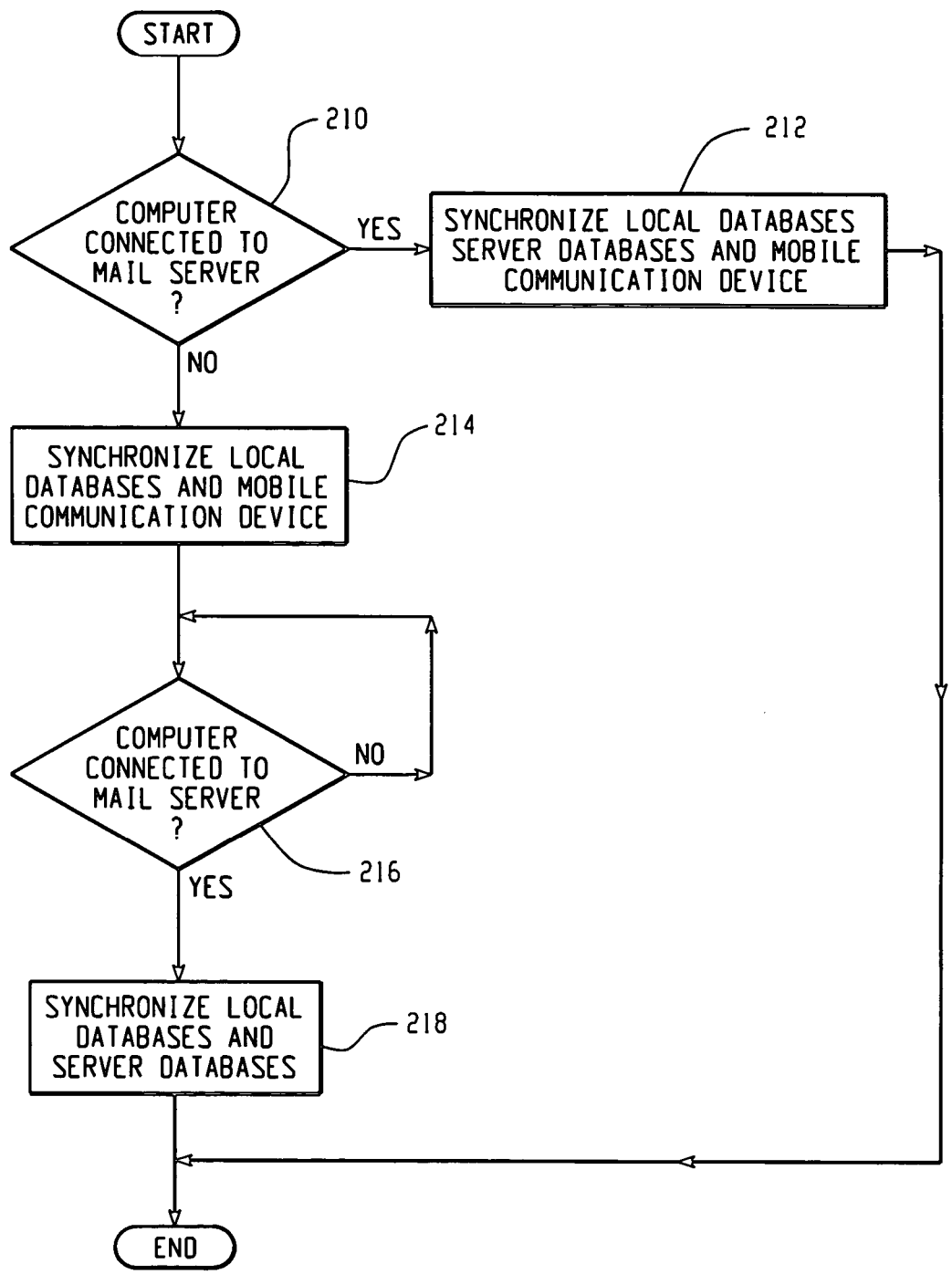
FIG. 12 is a flow chart showing an exemplary synchronization process between local databases, server databases and the mobile communication device.

FIG. 12 is a flow chart showing an exemplary synchronization process between local databases, server databases and the mobile communication device 24. As previously described, the synchronization process is initiated with the mobile communication device 24 is connected to the desktop system 120 via a link 151. Upon initiation of the synchronization process, the desktop system 124 determines whether it is connected to the servers 120 and 122, as shown in step 210. If the desktop system 124 is connected to the servers 120 and 122, then the mail database 128, the state database 134, the local mail database 138, the local state database 140 and the mobile communication device 24 are synchronized so that the status of data items stored in the mail database 128, the state database 134, the local mail database 138 and the local state database 140, and the data store 150 of the mobile communication device 24 are updated to a common state, as shown in step 212.

Often, however, the desktop system 124 is disconnected from the servers 120 and 122, or may not store a local mail database 138 and a local state database 140. Thus, in another embodiment, only the data store 150 of the mobile communication device and the mail database 128 and the state database 134 are synchronized when the desktop system 124 is connected to the servers 120 and 122, and the local mail database 138 and the local state database 140 are not synchronized.

Returning to step 210, if the desktop system 124 determines that it is not connected to the serves 120 and 122, then only the data store 150 of the mobile communication device 24 and the local mail database 138 and the local state database 140 are synchronized, as shown in step 214. The desktop system 124 thereafter monitors it connection status to servers 120 and 122 in step 216, and, upon connection to the servers 120 and 122, the mail database 128 and the state database 134 are synchronized with the local mail database 138 and the local state database 140.

Having described in detail several illustrative embodiments of the present invention, including illustrative examples of methods of operation, it is to be understood that the present invention is not limited to these particular embodiments and methods.

What is claimed is:

1. A method of exchanging data items between a mail server and a mobile communication device, the method comprising:
    detecting, by a redirector component, a data item received for a user at the mail server;
    creating a redirection record corresponding to the received data item, the redirection record including a unique identifier associated with the received data item and redirection status information regarding the received data item;
    determining, for the received data item, whether the redirection status information indicates that the data item should be transmitted to the mobile communication device, and when the redirection status information so indicates:
    retrieving the received data item determined for transmission by means of its unique identifier;
    causing to transmit the received data item to the mobile communication device; and
    updating the redirection status information to indicate that the received data item referenced by the associated unique identifier has been transmitted to the mobile communication device.

2. The method of claim 1, further comprising packaging the received data item into an electronic envelope addressed using an electronic address of the mobile communication device prior to transmitting the data item to the mobile communication device.

3. The method of claim 1, wherein the data item is detected by polling the mail server.

4. The method of claim 1, wherein the data item is detected by receiving a notification from the mail server.

5. The method of claim 1, further comprising encrypting the data item prior to transmitting the data item to the mobile communication device.

6. The method of claim 1, further comprising compressing the data item prior to transmitting the data item to the mobile communication device.

7. The method of claim 1, wherein the data item is transmitted to the mobile communication device through a wireless gateway that couples the redirector component to a wireless data network.

8. A network node configured for facilitating exchange of data items between a mail server and a mobile communication device, the network node comprising:
    means for detecting a data item received for a user at the mail server;
    means for creating a redirection record corresponding to the received data item, the redirection record including a unique identifier associated with the received data item and redirection status information regarding the received data item;
    means for determining, for the received data item, whether the redirection status information indicates that the data item should be transmitted to the mobile communication device; and
    means, responsive to determining that the redirection status information indicates that the data item is to be transmitted to the mobile communication device, for performing: retrieving the received data item from the mail server by means of its unique identifier, causing to transmit the received data item to the mobile communication device, and updating the redirection status information to indicate that the received data item referenced by the associated unique identifier has been transmitted to the mobile communication device.

9. The network node of claim 8, further comprising means for packaging the received data item into an electronic envelope addressed using an electronic address of the mobile communication device prior to transmitting the data item to the mobile communication device.

10. The network node of claim 8, wherein the data item is detected by polling the mail server.

11. The network node of claim 8, wherein the data item is detected by receiving a notification from the mail server.

12. The network node of claim 8, further comprising means for encrypting the data item prior to transmitting the data item to the mobile communication device.

13. The network node of claim 8, further comprising means for compressing the data item prior to transmitting the data item to the mobile communication device.

14. The network node of claim 8, further comprising a state database for storing the redirection record.

* * * * *